US007674842B2

(12) United States Patent
Belelie et al.

(10) Patent No.: US 7,674,842 B2
(45) Date of Patent: *Mar. 9, 2010

(54) PHASE CHANGE INKS CONTAINING CURABLE ISOCYANATE-DERIVED COMPOUNDS AND PHASE CHANGE INDUCING COMPONENTS

(75) Inventors: Jennifer L. Belelie, Oakville (CA); Peter G. Odell, Mississauga (CA); Marcel P. Breton, Mississauga (CA); Jeffrey H. Banning, Hillsboro, OR (US); Stephan V. Drappel, Toronto (CA); Chris A. Wagner, Etobicoke (CA)

(73) Assignee: Xerox Corporation, Norwalk, CT (US)

( * ) Notice: Subject to any disclaimer, the term of this patent is extended or adjusted under 35 U.S.C. 154(b) by 630 days.

This patent is subject to a terminal disclaimer.

(21) Appl. No.: 11/290,098

(22) Filed: Nov. 30, 2005

(65) Prior Publication Data
US 2007/0120909 A1 May 31, 2007

(51) Int. Cl.
*C09D 11/10* (2006.01)
(52) U.S. Cl. ............... 523/160; 522/173; 528/367; 528/369; 524/589; 524/590; 427/466
(58) Field of Classification Search .......... 522/90, 522/96, 97, 173, 79; 427/466; 524/589, 524/590; 528/367, 369; 523/160
See application file for complete search history.

(56) References Cited

U.S. PATENT DOCUMENTS

| | | | |
|---|---|---|---|
| 3,653,932 A | 4/1972 | Berry et al. | |
| 4,390,369 A | 6/1983 | Merritt et al. | |
| 4,484,948 A | 11/1984 | Merritt et al. | |
| 4,684,956 A | 8/1987 | Ball | |
| 4,851,045 A | 7/1989 | Taniguchi | |
| 4,889,560 A | 12/1989 | Jaeger et al. | |
| 4,889,761 A | 12/1989 | Titterington et al. | |
| 5,006,170 A | 4/1991 | Schwarz et al. | |
| 5,151,120 A | 9/1992 | You et al. | |
| 5,221,335 A | 6/1993 | Williams et al. | |
| 5,372,852 A | 12/1994 | Titterington et al. | |
| 5,459,214 A * | 10/1995 | Brahm et al. ............... 526/301 |
| 5,496,879 A | 3/1996 | Griebel et al. | |
| 5,621,022 A | 4/1997 | Jaeger et al. | |
| 5,645,632 A * | 7/1997 | Pavlin ............... 106/31.29 |
| 5,693,128 A | 12/1997 | Sacripante et al. | |
| 5,750,604 A | 5/1998 | Banning et al. | |
| 5,780,528 A | 7/1998 | Titterington et al. | |
| 5,782,966 A | 7/1998 | Bui et al. | |
| 5,783,658 A | 7/1998 | Banning et al. | |
| 5,827,918 A | 10/1998 | Titterington et al. | |
| 5,830,942 A | 11/1998 | King et al. | |
| 5,919,839 A | 7/1999 | Titterington et al. | |
| 6,040,357 A * | 3/2000 | Murphy et al. ............... 523/160 |
| 6,048,925 A | 4/2000 | Titterington et al. | |
| 6,239,189 B1 * | 5/2001 | Narayan et al. ............... 522/40 |
| 6,410,611 B1 | 6/2002 | Sakurai et al. | |
| 6,534,128 B1 | 3/2003 | Carlson et al. | |
| 6,586,492 B1 | 7/2003 | Caiger et al. | |
| 7,259,275 B2 | 8/2007 | Belelie et al. | |
| 7,276,614 B2 | 10/2007 | Toma et al. | |
| 7,279,587 B2 | 10/2007 | Odell et al. | |
| 7,293,868 B2 | 11/2007 | Odell | |
| 7,501,015 B2 | 3/2009 | Odell et al. | |
| 7,531,033 B2 | 5/2009 | Kovacs et al. | |
| 7,538,145 B2 | 5/2009 | Belelie et al. | |
| 7,541,406 B2 | 6/2009 | Banning et al. | |
| 7,559,639 B2 | 7/2009 | Belelie et al. | |
| 7,563,314 B2 | 7/2009 | Breton et al. | |
| 7,563,489 B2 | 7/2009 | Carlini et al. | |
| 7,571,999 B2 | 8/2009 | Kovacs et al. | |
| 7,572,325 B2 | 8/2009 | Breton et al. | |
| 2003/0232926 A1 | 12/2003 | Nikolic et al. | |
| 2006/0117993 A1 * | 6/2006 | Carlini et al. ............... 106/31.43 |
| 2006/0158491 A1 | 7/2006 | Belelie | |
| 2007/0119337 A1 | 5/2007 | Breton et al. | |
| 2007/0120909 A1 | 5/2007 | Belelie et al. | |
| 2007/0120910 A1 | 5/2007 | Odell et al. | |
| 2007/0120919 A1 | 5/2007 | Goredema et al. | |
| 2007/0120922 A1 | 5/2007 | Belelie | |

(Continued)

FOREIGN PATENT DOCUMENTS

| | | |
|---|---|---|
| EP | 0206286 B1 | 5/1990 |
| EP | 0187352 B1 | 6/1991 |
| EP | 0 878 482 B1 | 3/2003 |
| EP | 1 362 901 | 11/2003 |
| WO | WO 94/04619 | 3/1994 |
| WO | WO 94/14902 | 7/1994 |
| WO | WO 99/54416 | 10/1999 |

OTHER PUBLICATIONS

English abstract for German Patent Publication DE 4205636AL, Aug. 1993.
English abstract for German Patent Publication DE 4205713AL, Mar. 1996.
English abstract for Japanese Patent Publication No. JP 6200204, Jul. 1994.

*Primary Examiner*—Susan W Berman
(74) *Attorney, Agent, or Firm*—Oliff & Berridge, PLC

(57) ABSTRACT

Disclosed is a phase change ink comprising a colorant, an initiator, and a phase change ink carrier, said carrier comprising (A) a compound which is the reaction product of a mixture comprising (1) an isocyanate; and (2) a component comprising (a) an alcohol having at least one ethylenic unsaturation; (b) an amine having at least one ethylenic unsaturation; (c) an acid having at least one ethylenic unsaturation; or (d) mixtures thereof, (B) a phase change inducing component, said phase change inducing component containing at least one hydroxyl group, said phase change inducing component having a melting point of about 40° C. or higher, and (C) an optional curable viscosity modifying ester, said ink being curable upon exposure to ultraviolet radiation.

33 Claims, No Drawings

U.S. PATENT DOCUMENTS

2007/0120924 A1  5/2007  Odell et al.
2007/0123606 A1  5/2007  Toma et al.
2007/0123641 A1* 5/2007  Belelie et al. ............... 524/589
2007/0123642 A1* 5/2007  Banning et al. ............. 524/589

* cited by examiner

PHASE CHANGE INKS CONTAINING CURABLE ISOCYANATE-DERIVED COMPOUNDS AND PHASE CHANGE INDUCING COMPONENTS

CROSS-REFERENCE TO RELATED APPLICATIONS

Application U.S. Ser. No. 11/018,378, filed Dec. 22, 2004, now U.S. Pat. No. 7,293,868, entitled "Curable Phase Change Ink Composition," with the named inventors Peter G. Odell, Marcel P. Breton, Christine E. Bedford, and Chris A. Wagner, the disclosure of which is totally incorporated herein by reference, discloses ink compositions that comprise one or more radiation curable oil soluble components and one or more thermal solvents, as well as methods of preparing such ink compositions and methods of using such ink compositions.

Application U.S. Ser. No. 11/034,714, filed Jan. 14, 2005, U.S. Publication No. 2006/0158491, entitled "Ink Jet Ink of Functionalized Waxes," with the named inventors Jennifer L. Belelie, Peter G. Odell, Eniko Toma, Paul F. Smith, and Rina Carlini, the disclosure of which is totally incorporated herein by reference, discloses an ink jet ink including an ink vehicle wherein the ink vehicle includes at least one wax monomer functionalized to include in the chain at least one reactive group curable upon exposure to radiation. The reactive group is preferably curable via cationic or free radical polymerization. In a preferred embodiment, the ink vehicle includes a wax monomer having a structure:

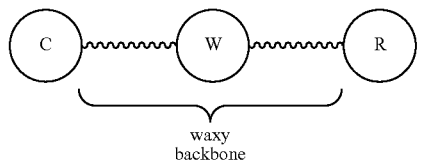

waxy backbone wherein C represents a cationically curable group and R represents a radically curable group. The inks may be used to form an image by jetting the ink onto a transfuse member surface, increasing the viscosity of the ink upon the transfuse member surface, subsequently transferring the ink from the transfuse member surface to an image receiving substrate, and exposing the ink to radiation following the transfer to the image receiving substrate to effect reaction of the at least one reactive group.

Copending Application U.S. Ser. No. 11/289,883 filed concurrently herewith, entitled "Phase Change Inks Containing Curable Isocyanate-Derived Compounds," with the named inventors Jeffery H. Banning, Jennifer L. Belelie, Peter G. Odell, Rina Carlini, Jule W. Thomas, Donald R. Titterington, Paul F. Smith, Stephan V. Drappel, and Chris Wagner, the disclosure of which is totally incorporated herein by reference, discloses a phase change ink comprising a colorant, an initiator, and a phase change ink carrier, said carrier comprising (A) a urethane which is the reaction product of a mixture comprising (1) an isocyanate; and (2) an alcohol selected from the group consisting of 1,4 butanediol vinyl ether, 2-allyloxy ethanol, 1,4-cyclohexanedimethanol vinyl ether, ethylene glycol vinyl ether, di(ethylene glycol) vinyl ether, and mixtures thereof; (B) a compound which is the reaction product of a mixture comprising (1) an isocyanate; and (2) a component comprising (a) an amine having at least one ethylenic unsaturation; (b) an acid having at least one ethylenic unsaturation; (c) a mixture of an amine having at least one ethylenic unsaturation and an alcohol having at least one ethylenic unsaturation; (d) a mixture of an acid having at least one ethylenic unsaturation and an alcohol having at least one ethylenic unsaturation; or (e) mixtures thereof; or (C) a mixture of (A) and (B); said ink being curable upon exposure to ultraviolet radiation.

U.S. Pat. No. 7,449,515, entitled "Phase Change Inks Containing Compounds Derived from Isocyanate, Unsaturated Alcohol, and Polyol," with the named inventors Jennifer L. Belelie, Rina Carlini, and Eniko Toma, the disclosure of which is totally incorporated herein by reference, discloses a phase change ink comprising a colorant, an initiator, and a phase change ink carrier, said carrier comprising (A) a first isocyanate-derived compound which is the reaction product of a mixture comprising (1) an isocyanate; and (2) a component comprising (a) an alcohol having at least one ethylenic unsaturation; (b) an amine having at least one ethylenic unsaturation; (c) an acid having at least one ethylenic unsaturation; or (d) mixtures thereof, (B) a second isocyanate-derived compound which is the reaction product of (1) a diisocyanate; (2) a monoalcohol having exactly one hydroxyl group and having at least one ethylenic unsaturation; and (3) a polyol having two or more hydroxyl groups, (C) an optional phase change inducing component, said phase change inducing component containing at least one hydroxyl group, said phase change inducing component having a melting point of about 40° C. or higher, and (D) an optional curable viscosity modifying ester, said ink being curable upon exposure to ultraviolet radiation.

Copending Application U.S. Ser. No. 11/289,552, filed concurrently herewith, entitled "Curable Overcoat for Wax-Based Inks," the disclosure of which is totally incorporated herein by reference, discloses an ink jettable overprint composition including at least one of a polymerizable monomer and/or a polymerizable oligomer, at least one photoinitiator, and at least one wax.

Copending Application U.S. Ser. No. 11/289,521, filed concurrently herewith, entitled "Curable Phase Change Compositions and Methods for Using Such Compositions," the disclosure of which is totally incorporated herein by reference, discloses a phase change curable composition comprising curable monomer, photoinitiator that initiates polymerization of the curable monomer, and phase change agent that provides the composition with an increase in viscosity of at least four orders of magnitude, from a first temperature, the first temperature being from 50° C. to 130° C., to a second temperature, the second temperature being from 0° C. to 70° C., wherein the second temperature is at least 10° C. below the first temperature. A coating over an image may be applied by providing a composition comprising curable monomer at a first temperature; applying the composition over the image, the image being at a second temperature; and exposing the composition to radiation to initiate polymerization of the curable monomer. In this process, the composition has a viscosity at the second temperature that is at least four orders of magnitude greater than its viscosity at the first temperature.

BACKGROUND

Disclosed herein are phase change inks containing isocyanate-based curable compounds. More specifically, disclosed herein are phase change inks containing isocyanate-based curable amides, ureas, urethanes, urea/urethanes, amide/urethanes, and the like. One embodiment is directed to a phase change ink comprising a colorant, an initiator, and a phase change ink carrier, said carrier comprising (A) a compound which is the reaction product of a mixture comprising (1) an isocyanate; and (2) a component comprising (a) an alcohol having at least one ethylenic unsaturation; (b) an amine having at least one ethylenic unsaturation; (c) an acid having at least one ethylenic unsaturation; or (d) mixtures thereof, (B) a phase change inducing component, said phase change inducing component containing at least one hydroxyl group, said phase change inducing component having a melting point of about 40° C. or higher, and (C) an optional curable viscosity modifying ester, said ink being curable upon exposure to ultraviolet radiation.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,048,925 (Titterington et al.), the disclosure of which is totally incorporated herein by reference, discloses urethane resins made by reacting selected nucleophiles, including alcohols, with an isocyanate. The order of addition of the isocyanate and the different nucleophiles can tailor the distribution of mixed urethane molecules in the final resin product. The final resin product can be colored or uncolored and include a toughening agent. The isocyanate-derived resin materials are useful as ingredients as phase change ink carrier compositions used to make phase change ink jet inks.

U.S. Pat. No. 5,919,839 (Titterington et al.), the disclosure of which is totally incorporated herein by reference, discloses colored waxes made by reacting selected nucleophiles, including alcohol containing colorants with an isocyanate. A phase change ink is made by blending the colored wax with a clear ink carrier composition. The clear ink carrier composition can be a fatty amide-based material and/or a combination of isocyanate-derived resins in which the order of addition of the isocyanate and the different nucleophiles can tailor the distribution of di-urethane, mixed urethane/urea, and/or di-urea molecules in the final resin product. The colored wax materials are useful as ingredients with phase change ink carrier compositions to make phase change ink jet inks.

U.S. Pat. No. 5,830,942 (King et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of diurethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,827,918 (Titterington et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of diurethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,783,658 (Banning et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,782,966 (Bui et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,780,528 (Titterington et al.), the disclosure of which is totally incorporated herein by reference, discloses isocyanate-derived colored resins made by reacting an alcohol and/or amine, an isocyanate and a nucleophilic molecule containing a chromogen. The isocyanate-derived colored resins are useful as colorant materials in phase change ink compositions.

U.S. Pat. No. 5,750,604 (Banning et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

PCT Patent Publication WO 94/14902 (Griffiths et al.), the disclosure of which is totally incorporated herein by reference, discloses a material suitable for use in a hot melt ink, having a melting point of at least 65° C. and obtainable by reacting an aliphatic or aromatic diisocyanate with an at least stoichiometric amount of: (i) a monohydric alcohol component; or (ii) a monohydric alcohol component followed by another different monohydric alcohol component; or (iii) a monohydric alcohol component, followed by a dihydric alcohol component followed by a monohydric alcohol component; the monohydric alcohol component(s) comprising a monohydric aliphatic alcohol or an etherified or esterified dihydric aliphatic alcohol or dihydric polyalkylene glycol; as the dihydric alcohol component comprising a dihydric aliphatic alcohol or a dihydric polyalkylene glycol and being used in an amount of not more than 50 percent of the stoichiometric amount of hydroxyl groups required to react with the isocyanate groups on the diisocyanate.

U.S. Pat. No. 6,534,128 (Carlson et al.), the disclosure of which is totally incorporated herein by reference, discloses low viscosity, radiation curable urethane oligomers, preferably a radiation curable polyester urethane oligomer, that can be incorporated into radiation curable ink compositions. Preferred embodiments are suitable for ink jetting applications. The ink jettable embodiments are particularly well-suited for use in piezo ink jet printers. The viscosity characteristics of the compositions are such that conventional solvent is not required in order to satisfy the requisite low ink jet viscosity specifications. The oligomer generally is a reaction product of ingredients comprising an aliphatic polyisocyanate; and a radiation curable, polyester alcohol comprising one or more radiation curable moieties, one or more hydroxyl moieties, and one or more ester moieties.

U.S. Pat. No. 6,586,492 and PCT Patent Publication WO 99/54416 (Caiger et al.), the disclosures of each of which are totally incorporated herein by reference, disclose an ink-jet ink including an ink jet vehicle and a colorant. The vehicle includes at least 35 percent by weight radiation curable material, based on the total vehicle weight. The vehicle may but does not necessarily include a thickener. The vehicle is a paste or a solid at 20° C. and has a viscosity of less than 25 centipoise between 40° C. and 130° C.

U.S. Pat. No. 6,410,611 and European Patent Publication EP 0 878 482 (Sakurai et al.), the disclosures of each of which are totally incorporated herein by reference, disclose an active energy ray curable composition which can be cured in the absence of a photoinitiator and which can also be cured at practical light intensities and irradiating energy, and a method for curing the curable composition, in which the composition comprises a maleimide derivative represented by the formula

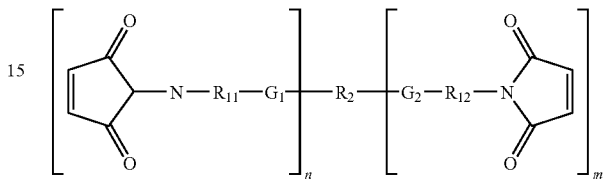

wherein m and n each represent an integer of 1 to 5, and the total of m and n is 6 or smaller, $R_{11}$ and $R_{12}$ each represent a linking group selected from the group consisting of (1) an alkylene group, (2) an alicyclic group, (3) an arylalkylene group, and (4) a cycloalkylalkyene group, $G_1$ and $G_2$ each represent an ester linkage selected from the group consisting of —COO— and —OCO—, $R_2$ represents a linking chain having an average molecular weight of 100 to 100,000 selected from the group consisting of (A) a (poly)ether linking chain and (B) a (poly)ester linking chain, in which at least one organic group selected from the group consisting of (1) a straight chain alkylene group, (2) a branched alkylene group, (3) an alkylene group having a hydroxyl group, (4) an alicyclic group, (5) an aryl group, and (6) an arylalkylene group is connected via at least one linkage selected from the group consisting of (a) an ether linkage and (b) an ester linkage.

Japanese Patent Publication JP 6200204, the disclosure of which is totally incorporated herein by reference, discloses a normally solid jet recording ink which can melt at a relatively low temperature and can cure immediately when irradiated with ultraviolet rays. The ink comprises a wax having a melting point of 40 to 70° C., a resin having a melting point of 40 to 70° C., a prepolymer, a monomer, a photopolymerization initiator, a dye, and a pigment. This ink is normally solid because it contains the above-specified wax. When the ultraviolet curable resin is irradiated with ultraviolet rays from an ultraviolet lamp, the ink can fix immediately and satisfactorily on plain paper or printing paper.

U.S. Patent Publication 2003/0232926 and European Patent Publication EP 1 362 901 (Nikolic et al.), the disclosures of each of which are totally incorporated herein by reference, disclose a film adhesive prepared from an adhesive composition comprising a polymer system, a film forming rubber compound, and curing agents for the polymeric system. The polymer system comprises a base polymer and electron donor and electron acceptor functionality.

U.S. Pat. No. 5,693,128 (Sacripante et al.), the disclosure of which is totally incorporated herein by reference, discloses an ink composition comprising a colorant and a reversible crosslinked component vehicle obtained from the reaction product of an anhydride and an organoamine, which ink possesses a viscosity of from about 1 centipoise to about 25 centipoise at a temperature of from about 125° C. to about 185° C.

While known compositions and processes are suitable for their intended purposes, a need remains for improved phase change ink compositions. In addition, a need remains for phase change inks that produce images with improved scratch resistance. Further, a need remains for phase change inks that produce images with improved adhesion to substrates such as paper. Additionally, a need remains for ultraviolet curable compounds that are soluble in phase change ink carriers. There is also a need for ultraviolet curable compounds that can be incorporated into phase change ink carriers without adversely affecting the viscosity characteristics of the ink at desired jetting temperatures. In addition, there is a need for ultraviolet curable compounds that can be incorporated into phase change ink carriers without adversely affecting the melting point of the ink. Further, there is a need for ultraviolet curable phase change inks that can be used in ink jet printing processes wherein the ink is first jetted onto an intermediate transfer member and subsequently transferred from the transfer member to a final substrate such as paper or transparency material. Additionally, there is a need for ultraviolet curable phase change inks that can be used in ink jet printing processes wherein the ink is first jetted onto an intermediate transfer member and subsequently transferred from the transfer member to a final substrate such as paper or transparency material, wherein the intermediate transfer member is maintained at a temperature between the jetting temperature of the ink and the temperature of the final substrate. A need also remains for ultraviolet curable compounds that can be incorporated into phase change ink carriers to be used in printing processes using heated intermediate transfer members without adversely affecting the temperature at which the intermediate transfer member can effectively transfuse the image thereon to the final substrate. In addition, a need remains for curable phase change inks suitable for use in printing processes using heated intermediate transfer members wherein the ink has desirable viscosity values at the desired jetting temperatures. Further, a need remains for curable phase change inks suitable for use in printing processes using heated intermediate transfer members wherein the ink has desirable viscosity values at the desired intermediate transfer member temperatures. Additionally, a need remains for curable phase change inks suitable for use in printing processes using heated intermediate transfer members wherein the ink generates images with reduced showthrough. There is also a need for curable phase change inks suitable for use in printing processes using heated intermediate transfer members wherein the ink exhibits improved transfer and fusing from the intermediate transfer member to the final recording sheet. In addition, there is a need for curable phase change inks suitable for use in printing processes using heated intermediate transfer members wherein the ink exhibits improved robustness on the final recording sheet. Further, there is a need for phase change ink carrier components that are compatible with curable components therein.

SUMMARY

Disclosed herein is a phase change ink comprising a colorant, an initiator, and a phase change ink carrier, said carrier comprising (A) a compound which is the reaction product of a mixture comprising (1) an isocyanate; and (2) a component comprising (a) an alcohol having at least one ethylenic unsaturation; (b) an amine having at least one ethylenic unsaturation; (c) an acid having at least one ethylenic unsaturation; or (d) mixtures thereof, (B) a phase change inducing component, said phase change inducing component containing at least one hydroxyl group, said phase change inducing component having a melting point of about 40° C. or higher, and (C) an optional curable viscosity modifying ester, said ink being curable upon exposure to ultraviolet radiation.

DETAILED DESCRIPTION

The compounds disclosed herein are the reaction product of a mixture comprising (1) an isocyanate; and (2) a component comprising (a) an alcohol having at least one ethylenic unsaturation; (b) an amine having at least one ethylenic unsaturation; (c) an acid having at least one ethylenic unsaturation; or (d) mixtures thereof. These reaction products can include amides, ureas, urethanes, urea/urethanes, amide/urethanes, and the like, as well as mixtures thereof. For example, the reaction products of an alcohol and an isocyanate can include urethanes. The reaction products of an amine and an isocyanate can include ureas. The reaction products of an acid and an isocyanate can include amides. The reaction products of an isocyanate and a mixture of an alcohol and an amine can include urea-urethanes. The reaction products of an isocyanate and a mixture of an acid and an alcohol can include amide-urethanes.

Suitable isocyanates include monomeric, oligomeric, and polymeric isocyanates, including (but are not limited to) those of the general formula $R_1$—$(NCO)_n$ wherein $R_1$ is (i) an alkyl or alkylene group (including linear and branched, saturated and unsaturated, cyclic and acyclic, and substituted and unsubstituted alkyl and alkylene groups, and wherein hetero atoms, such as oxygen, nitrogen, sulfur, silicon, phosphorus, and the like either may or may not be present in the alkyl or alkylene group), in one embodiment with at least about 8 carbon atoms, in another embodiment with at least about 10 carbon atoms, and in yet another embodiment with at least about 12 carbon atoms, and in one embodiment with no more than about 60 carbon atoms, in another embodiment with no more than about 50 carbon atoms, and in yet another embodiment with no more than about 40 carbon atoms, although the number of carbon atoms can be outside of these ranges, (ii) an aryl or arylene group (including substituted and unsubstituted aryl and arylene groups, and wherein hetero atoms, such as oxygen, nitrogen, sulfur, silicon, phosphorus, and the like either may or may not be present in the aryl or arylene group), in one embodiment with at least about 5 carbon atoms, and in another embodiment with at least about 6 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, (iii) an arylalkyl or arylalkylene group (including substituted and unsubstituted arylalkyl and arylalkylene groups, wherein the alkyl portion of the arylalkyl or arylalkylene group can be linear or branched, saturated or unsaturated, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl or arylalkylene group), in one embodiment with at least about 6 carbon atoms, and in another embodiment with at least about 7 carbon atoms, and in one embodiment with no more than about 60 carbon atoms, in another embodiment with no more than about 40 carbon atoms, and in yet another embodiment with no more than about 30 carbon atoms, although the number of carbon atoms can be outside of these ranges, or (iv) an alkylaryl or alkylarylene group (including substituted and unsubstituted alkylaryl and alkylarylene groups, wherein the alkyl portion of the alkylaryl or alkylarylene group can be linear or branched, saturated or unsaturated, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl or alkylarylene group), in one embodiment with at least about 6 carbon atoms, and in another embodiment with at least about 7 carbon atoms, and in one embodiment with no more than about 60 carbon atoms, in another embodiment with no more than about 40 carbon atoms, and in yet another embodiment with no more than about 30 carbon atoms, although the number of carbon atoms can be outside of these ranges, wherein the substituents on the substituted alkyl, alkylene, aryl, arylene, arylalkyl, arylalkylene, alkylaryl, and alkylarylene groups can be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, mixtures thereof, and the like, wherein two or more substituents can be joined together to form a ring, and n is an integer representing the number of isocyanate groups, being, for example, 1, 2, 3, or the like in the instance of monomeric isocyanates and having no necessary upper limit in the case of polymeric isocyanates.

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include n-octadecylisocyanate, of the formula

other isomers of octadecylisocyanate; hexadecylisocyanate; octylisocyanate; n-butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like, as well as mixtures thereof. Examples of diisocyanates include isophorone diisocyanate (IPDI), of the formula

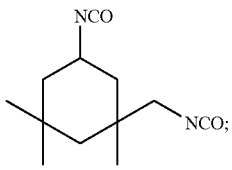

toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), of the formula

naphthalene-1,5-diisocyanate; 3,3'-dimethoxy-4,4'-biphenyldiisocyanate; 3,3'-dimethyl-4,4'-bimethyl-4,4'-biphenyl-diisocyanate; phenylene diisocyanate; 4,4'-biphenyldiisocyanate; 2,2,4-trimethylhexamethylene diisocyanate and 2,4,4-trimethylhexamethylene diisocyanate, of the formulae

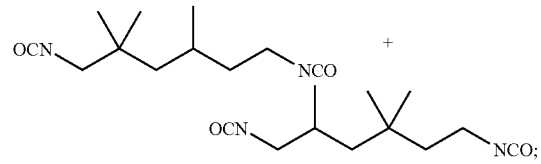

tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Examples of suitable acids include any ethylenically unsaturated acid, including (but not limited to) those of the formula $R_2$—COOH wherein $R_2$ is (i) an alkyl group having at least one ethylenic unsaturation therein (including linear and branched, cyclic and acyclic, and substituted and unsubstituted alkyl groups, and wherein hetero atoms, such as oxygen, nitrogen, sulfur, silicon, phosphorus, and the like either may or may not be present in the alkyl group), in one embodiment with at least about 2 carbon atoms, in another embodiment with at least about 4 carbon atoms, in yet another embodiment with at least about 6 carbon atoms, and in still another embodiment with at least about 10 carbon atoms, and in one embodiment with no more than about 40 carbon atoms, in another embodiment with no more than about 30 carbon atoms, in yet another embodiment with no more than about 22 carbon atoms, and in still another embodiment with no more than about 11 carbon atoms, although the number of carbon atoms can be outside of these ranges, (ii) an arylalkyl group having at least one ethylenic unsaturation therein (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, or (iii) an alkylaryl group having at least one ethylenic unsaturation therein (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, wherein the substituents on the substituted alkyl, arylalkyl, and alkylaryl groups can be (but are not limited to) hydroxy groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, thiocyanato groups, isothiocyanato groups, carboxylate groups, carboxylic acid groups, urethane groups, urea groups, mixtures thereof, and the like, wherein two or more substituents can be joined together to form a ring.

Some specific examples of suitable ethylenically unsaturated acids include 10-undecenoic acid, of the formula

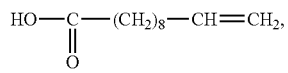

21-docosenoic acid, 6-heptenoic acid, 2,2-dimethyl-4-pentenoic acid, 2,2-dimethyl-but-3-enoic acid, acrylic acid, methacrylic acid, 3-butenoic acid, 3,7-dimethyl-6-octenoic acid, crotonic acid, 9-decenoic acid, 3-hexenoic acid, 2-methyl-3-butenoic acid, 7-oxo-11-dodecenoic acid, 7-oxo-16-heptadecenoic acid, 6-oxo-15-hexadecenoic acid, 7-oxo-8-nonenoic acid, 4-pentenoic acid, and the like, as well as mixtures thereof.

If desired, a mixture of acids including an ethylenically unsaturated acid and an acid containing no ethylenic unsaturations can be used in the reaction with the isocyanate. By so doing, the characteristics of the product can be further tailored as desired. For example, the ethylenically unsaturated acid can impart to the product curability, when in the presence of one or more suitable photoinitiators, upon exposure to ultraviolet radiation, while the acid containing no ethylenic unsaturations can impart to the product desirable solubility characteristics.

Examples of suitable acids containing no ethylenic unsaturations include (but are not limited to) those of the formula $R_2'$-COOH wherein $R_2'$ is (i) an alkyl group (including linear and branched, cyclic and acyclic, and substituted and unsubstituted alkyl groups, and wherein hetero atoms, such as oxygen, nitrogen, sulfur, silicon, phosphorus, and the like either may or may not be present in the alkyl group), in one embodiment with at least about 7 carbon atoms, in another embodiment with at least about 10 carbon atoms, in yet another embodiment with at least about 15 carbon atoms, and in still another embodiment with at least about 30 carbon atoms, and in one embodiment with no more than about 60 carbon atoms, in another embodiment with no more than about 50 carbon atoms, and in yet another embodiment with no more than about 40 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, (iii) an arylalkyl group (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, or (iv) an alkylaryl group (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, thiocyanato groups, isothiocyanato groups, carboxylate groups, carboxylic acid groups, urethane groups, urea groups, mixtures thereof, and the like, wherein two or more substituents can be joined together to form a ring.

Specific examples of suitable acids containing no ethylenic unsaturations include, but are not limited to, formic acid, acetic acid, propionic acid, butyric acid (all isomers), valeric acid (all isomers), hexanoic acid (all isomers), heptanoic acid (all isomers), octanoic acid (all isomers), nonanoic acid (all isomers), decanoic acid (all isomers), undecanoic acid (all isomers), dodecanoic acid (all isomers), tridecanoic acid (all isomers), tetradecanoic acid (all isomers), pentadecanoic acid (all isomers), hexadecanoic acid (all isomers), heptadecanoic acid (all isomers), octadecanoic acid (all isomers), nonadecanoic acid (all isomers), eicosanoic acid (all isomers), heneicosanoic acid (all isomers), docosanoic acid (all isomers), cyclohexanecarboxylic acid, cyclopentylacetic acid, cycloheptanecarboxylic acid, 2-norbornaneacetic acid, and the like, as well as mixtures thereof. Also suitable are mixtures of acids having the structure $CH_3(CH_2)_n COOH$ wherein n has an average value of from about 16 to about 50, commercially available as, for example, UNICID® 350, UNICID® 425, UNICID® 550, and UNICID® 700 with Mn values of about 390, 475, 565, and 720, respectively. Other suitable acids having no ethylenic unsaturations include those of the general formula $CH_3(CH_2)_nCOOH$, such as tetracosanoic or lignoceric acid (n=22), hexacosanoic or cerotic acid (n=24), heptacosanoic or carboceric acid (n=25), octacosanoic or montanic acid (n=26), triacontanoic or melissic acid (n=28), dotriacontanoic or lacceroic acid (n=30), tritriacontanoic or ceromelissic or psyllic acid (n=31), tetratriacontanoic or geddic acid (n=32), pentatriacontanoic or ceroplastic acid (n=33), isomers thereof, and the like. Also suitable is PRIPOL® 1009, a C-36 dimer acid mixture including isomers of the formula

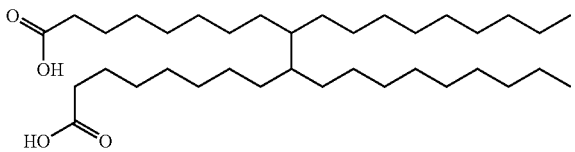

as well as other branched isomers, which may include unsaturations and cyclic groups, commercially available from Uniqema, New Castle, Del.; further information on $C_{36}$ dimer acids of this type is disclosed in, for example, "Dimer Acids," *Kirk-Othmer Encyclopedia of Chemical Technology*, Vol. 8, $4^{th}$ Ed. (1992), pp. 223 to 237, the disclosure of which is totally incorporated herein by reference. Mixtures of two or more of any of these acids are also suitable.

Examples of suitable alcohols include any ethylenically unsaturated alcohol, including (but not limited to) those of the formula $R_3$—OH wherein $R_3$ is (i) an alkyl group having at least one ethylenic unsaturation therein (including linear and branched, cyclic and acyclic, and substituted and unsubstituted alkyl groups, and wherein hetero atoms, such as oxygen, nitrogen, sulfur, silicon, phosphorus, and the like either may or may not be present in the alkyl group), in one embodiment with at least about 5 carbon atoms, in another embodiment with at least about 8 carbon atoms, and in yet another embodiment with at least about 12 carbon atoms, and in one embodiment with no more than about 50 carbon atoms, in another embodiment with no more than about 30 carbon atoms, and in yet another embodiment with no more than about 15 carbon atoms, although the number of carbon atoms can be outside of these ranges, (ii) an arylalkyl group having at least one ethylenic unsaturation therein (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, or (iii) an alkylaryl group having at least one ethylenic unsaturation therein (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, wherein the substituents on the substituted alkyl, arylalkyl, and alkylaryl groups can be (but are not limited to) hydroxy groups, amine groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, thiocyanato groups, isothiocyanato groups, carboxylate groups, carboxylic acid groups, urethane groups, urea groups, mixtures thereof, and the like, wherein two or more substituents can be joined together to form a ring.

Some specific examples of suitable ethylenically unsaturated alcohols include 1,4-butanediol vinyl ether, of the formula

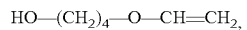

available from Sigma-Aldrich, Milwaukee, Wis., 2-allyloxyethanol, of the formula

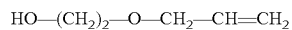

1,4-cyclohexanedimethanol vinyl ether (cis and trans isomers), of the formula

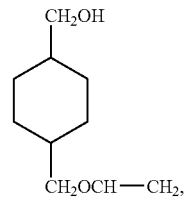

ethylene glycol vinyl ether, of the formula

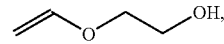

di(ethylene glycol) vinyl ether, of the formula

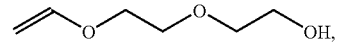

TONE M-100, commercially available from Dow Chemical Company, Midland, Mich., believed to be of the formula

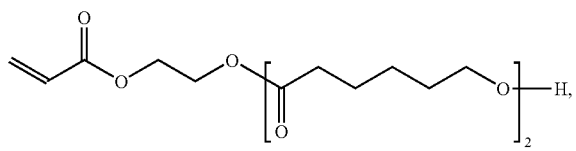

compounds of the formula

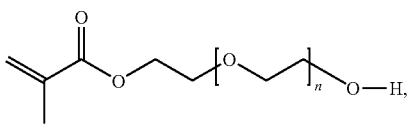

such as CD572, wherein n=10, commercially available from Sartomer Company, Exton, Pa., and the like, as well as mixtures thereof.

If desired, a mixture of alcohols including an ethylenically unsaturated alcohol and an alcohol containing no ethylenic unsaturations can be used in the reaction with the isocyanate. By so doing, the characteristics of the product can be further tailored as desired. For example, the ethylenically unsaturated alcohol can impart to the product curability, when in the presence of one or more suitable photoinitiators, upon exposure to ultraviolet radiation, while the alcohol containing no ethylenic unsaturations can impart to the product desirable solubility characteristics.

Examples of suitable alcohols containing no ethylenic unsaturations include (but are not limited to) those of the formula $R_3'$-OH wherein $R_3'$ is (i) an alkyl group (including linear and branched, cyclic and acyclic, and substituted and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, in another embodiment with at least about 6 carbon atoms, in yet another embodiment with at least about 10 carbon atoms, and in still another embodiment at least about 16 carbon atoms, and in one embodiment with no more than about 60 carbon atoms, in another embodiment with no more than about 50 carbon atoms, and in yet another embodiment with no more than about 40 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, (iii) an arylalkyl group (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, or (iv) an alkylaryl group (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, wherein the substituents on the substituted alkyl, aryl, arylalkyl, and alkylaryl groups can be (but are not limited to) hydroxy groups, amine groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, thiocyanato groups, isothiocyanato groups, carboxylate groups, carboxylic acid groups, urethane groups, urea groups, mixtures thereof, and the like, wherein two or more substituents can be joined together to form a ring.

Specific examples of suitable alcohols containing no ethylenic unsaturations include aliphatic alcohols, including linear, branched, and cyclic aliphatic alcohols, such as methanol, ethanol, propanol (all isomers), butanol (all isomers), pentanol (all isomers), hexanol (all isomers), heptanol (all isomers), octanol (all isomers), nonanol (all isomers), decanol (all isomers), undecanol (all isomers), dodecanol (all isomers), tridecanol (all isomers), tetradecanol (all isomers), pentadecanol (all isomers), hexadecanol (all isomers), heptadecanol (all isomers), octadecanol (all isomers), nonadecanol (all isomers), eicosanol ($C_{20}H_{41}OH$; all isomers), heneicosanol ($C_{21}H_{43}OH$; all isomers), docosanol ($C_{22}H_{45}OH$; all isomers), and the like, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like; aliphatic/aromatic alcohols, such as benzyl alcohol, octyl, nonyl, and dodecylphenol alkoxylates of octyl, nonyl, and dodecylphenol, and alkoxyphenol; aromatic alcohols such as phenol, naphthol, and the like, and their derivatives; fused ring alcohols, such as rosin alcohols, cholesterol, vitamin E, dimer diol, of the formula HO—$C_{36}H_{64+n}$—OH wherein n is an integer of 0, 1, 2, 3, 4, 5, 6, 7, 8, 9, or 10, including isomers of the formula

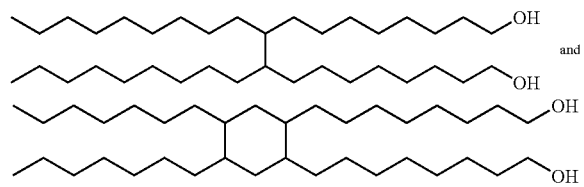

as well as unsaturated and cyclized derivatives, and the like, commercially available from Uniqema Chemicals, New Castle, Del., Guerbet alcohols, which are 2,2-dialkyl-1-ethanols, including (but not limited to) those of the general formula

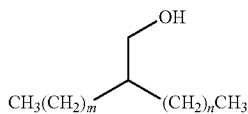

wherein m+n is greater than or equal to 10, in one embodiment being from about 16 to about 36, commercially available from Tomah Chemicals and Jarchem Industries Inc., Newark, N.J., the UNILIN® products available from Petrolite Chemicals, including but not limited to those of the formula $CH_3(CH_2)_aOH$ wherein a is an integer of from about 25 to about 50, branched and straight chain alcohols available from Sigma-Aldrich, Milwaukee, Wis., including but not limited to those of the formula $C_bH_{2b}OH$ wherein b is an integer of from about 9 to about 24, and other alcohols, such as N,N-dimethyl-N-ethanolamine, stearamide-monoethanolamine, tripropyleneglycol monomethylether, hydroxybutanone, menthol, isoborneol, terpineol, 12-hydroxy stearyl stearamide, ethylene glycol, diethylene glycol, triethylene glycol, dimethylolpropionic acid, sucrose, polytetramethylene glycol, polypropylene glycol, polyester polyols, polyethylene glycol, pentaerythritol, triethanolamine, glycerin, 1,6-hexanediol, N-methyl-N,N-diethanol amine, trimethylol propane, N,N,N',N'-tetrakis(2-hydroxypropyl)ethylenediamine, and the like, as well as mixtures thereof.

Examples of suitable amines include any ethylenically unsaturated primary or secondary amine, including (but not limited to) those of the formula $R_4$—$NHR_5$ wherein $R_4$ is (i) an alkyl group having at least one ethylenic unsaturation therein (including linear and branched, cyclic and acyclic, and substituted and unsubstituted alkyl groups, and wherein hetero atoms, such as oxygen, nitrogen, sulfur, silicon, phosphorus, and the like either may or may not be present in the alkyl group), in one embodiment with at least about 5 carbon atoms, in another embodiment with at least about 8 carbon atoms, and in yet another embodiment with at least about 12 carbon atoms, and in one embodiment with no more than about 50 carbon atoms, in another embodiment with no more than about 30 carbon atoms, and in yet another embodiment with no more than about 15 carbon atoms, although the number of carbon atoms can be outside of these ranges, (ii) an arylalkyl group having at least one ethylenic unsaturation therein (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, or (iii) an alkylaryl group having at least one ethylenic unsaturation therein (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, and wherein $R_5$ can be (i) a hydrogen atom, (ii) an alkyl group (including linear and branched, saturated and unsaturated, cyclic and acyclic, and substituted and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 50 carbon atoms, in another embodiment with no more than about 30 carbon atoms, and in yet another embodiment with no more than about 15 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 30 carbon atoms, and in yet another embodiment with no more than about 15 carbon atoms, although the number of carbon atoms can be outside of these ranges, (iv) an arylalkyl group (including substituted and unsubstituted arylalkyl groups, wherein the alkyl portion of the arylalkyl group can be linear or branched, saturated or unsaturated, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 30 carbon atoms, and in yet another embodiment with no more than about 15 carbon atoms, although the number of carbon atoms can be outside of these ranges, or (v) an alkylaryl group (including substituted and unsubstituted alkylaryl groups, wherein the alkyl portion of the alkylaryl group can be linear or branched, saturated or unsaturated, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 30 carbon atoms, and in yet another embodiment with no more than about 15 carbon atoms, although the number of carbon atoms can be outside of these ranges, wherein the substituents on the substituted alkyl, aryl, arylalkyl, and alkylaryl groups can be (but are not limited to) hydroxy groups, amine groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, thiocyanato groups, isothiocyanato groups, carboxylate groups, urethane groups, urea groups, mixtures thereof, and the like, wherein two or more substituents can be joined together to form a ring.

Examples of suitable amines include 2(1-cyclohexenyl)ethylamine, commercially available from Sigma-Aldrich Chemical Co., Milwaukee, Wis., of the formula

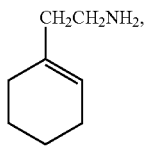

N-ethyl-2-methylallylamine, commercially available from Sigma-Aldrich Chemical Co., Milwaukee, Wis., of the formula

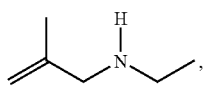

monoethanolamine vinyl ether, commercially available from Alash Ltd., Temirtau, Kazakhstan, of the formula

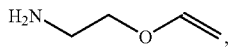

and the like.

If desired, a mixture of amines including an ethylenically unsaturated amine and an amine containing no ethylenic unsaturations can be used in the reaction with the isocyanate. By so doing, the characteristics of the product can be further tailored as desired. For example, the ethylenically unsaturated amine can impart to the product curability, when in the presence of one or more suitable photoinitiators, upon exposure to ultraviolet radiation, while the amine containing no ethylenic unsaturations can impart to the product desirable solubility characteristics.

Examples of suitable amines containing no ethylenic unsaturations include (but are not limited to) those of the formula $R_4'$-$NHR_5'$ wherein $R_4'$ is (i) an alkyl group (including linear and branched, cyclic and acyclic, and substituted and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 6 carbon atoms, in yet another embodiment with at least about 10 carbon atoms, and in still another embodiment with at least about 16 carbon atoms, and in one embodiment with no more than about 60 carbon atoms, in another embodiment with no more than about 50 carbon atoms, and in yet another embodiment with no more than about 40 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 40 carbon atoms, and in yet another embodiment with no more than about 30 carbon atoms, although the number of carbon atoms can be outside of these ranges, (iii) an arylalkyl group (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 40 carbon atoms, and in yet another embodiment with no more than about 30 carbon atoms, although the number of carbon atoms can be outside of these ranges, or (iv) an alkylaryl group (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 40 carbon atoms, and in yet another embodiment with no more than about 30 carbon atoms, although the number of carbon atoms can be outside of these ranges, and wherein $R_5'$ can be (i) a hydrogen atom, (ii) an alkyl group (including linear and branched, saturated and unsaturated, cyclic and acyclic, and substituted and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 50 carbon atoms, in another embodiment with no more than about 40 carbon atoms, and in yet another embodiment with no more than about 30 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 40 carbon atoms, and in yet another embodiment with no more than about 30 carbon atoms, although the number of carbon atoms can be outside of these ranges, (iv) an arylalkyl group (including substituted and unsubstituted arylalkyl groups, wherein the alkyl portion of the arylalkyl group can be linear or branched, saturated or unsaturated, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 40 carbon atoms, and in yet another embodiment with no more than about 30 carbon atoms, although the number of carbon atoms can be outside of these ranges, or (v) an alkylaryl group (including substituted and unsubstituted alkylaryl groups, wherein the alkyl portion of the alkylaryl group can be linear or branched, saturated or unsaturated, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 40 carbon atoms, and in yet another embodiment with no more than about 30 carbon atoms, although the number of carbon atoms can be outside of these ranges, wherein the substituents on the substituted alkyl, aryl, arylalkyl, and alkylaryl groups can be (but are not limited to) hydroxy groups, amine groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, thiocyanato groups, isothiocyanato groups, carboxylate groups, urethane groups, urea groups, mixtures thereof, and the like, wherein two or more substituents can be joined together to form a ring.

Specific examples of suitable amines containing no ethylenic unsaturations include aliphatic primary and secondary amines, including linear, branched, and cyclic aliphatic amines, such as methyl amine, ethyl amine, propyl amine (all isomers), butyl amine (all isomers), pentyl amine (all isomers), hexyl amine (all isomers), heptyl amine (all isomers), octyl amine (all isomers), nonyl amine (all isomers), decyl amine (all isomers), undecyl amine (all isomers), dodecyl amine (all isomers), tridecyl amine (all isomers), tetradecyl amine (all isomers), pentadecyl amine (all isomers), hexadecyl amine (all isomers), heptadecyl amine (all isomers), octadecyl amine (all isomers), nonadecyl amine (all isomers), eicosyl amine ($C_{20}H_{41}NH$; all isomers), heneicosyl amine ($C_{21}H_{43}NH$; all isomers), docosyl amine ($C_{22}H_{45}NH$; all isomers), dimethyl amine, diethyl amine, dipropyl amine (all isomers), dibutyl amine (all isomers), dipentyl amine (all isomers), dihexyl amine (all isomers), diheptyl amine (all isomers), dioctyl amine (all isomers), dinonylamine (all isomers), didecyl amine (all isomers), diundecyl amine (all isomers), didodecyl amine (all isomers), ditridecyl amine (all isomers), ditetradecyl amine (all isomers), dipentadecyl amine (all isomers), dihexadecyl amine (all isomers), diheptadecyl amine (all isomers), dioctadecyl amine (all isomers), cyclohexyl amine, dicyclohexyl amine, 2,3-dimethyl-1-cyclohexylamine, piperidine, pyrrolidine, and the like; an aliphatic/aromatic amine, such as benzyl amine or analogues with longer or additional alkyl chains; aromatic amines, such as aniline, anisidine, and the like; fused ring amines, such as rosin amine, tetrahydroabietyl amine, and the like; and miscellaneous amines, such as adamantyl amine, isonipecotamide, polyoxyalkylenemonoamines, such as M-series JEFFAMINES® available commercially from Huntsman Chemical Company of Austin, Tex.; 3,3'-diamino-N-methyldipropylamine, and the like. Small amounts (on a molar basis) of polyamines can also be incorporated into the reaction mixture to produce oligomeric species in the resins if so desired.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of these compounds include ethanolamine, diethanolamine, and the like.

Examples of compounds that can be prepared include (but are not limited to) urethanes of the formula

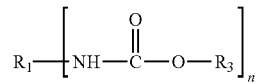

wherein n represents the number of repeat urethane functional groups and is at least 1 (for example, 1 in the instance of a reaction between a monoisocyanate and a monoalcohol, 2 in the instance of a reaction between a diisocyanate and a monoalcohol, 3, 4, 5, 6, and the like, with n having no necessary upper limit), ureas of the formula

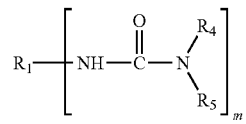

wherein m represents the number of repeat urea functional groups and is at least 1 (for example, 1 in the instance of a reaction between a monoisocyanate and a monoamine, 2 in the instance of a reaction between a diisocyanate and a monoamine, 3, 4, 5, 6, and the like, with n having no necessary upper limit), amides of the formula

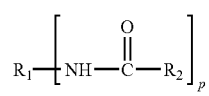

wherein p represents the number of repeat amide functional groups and is at least 1 (for example, 1 in the instance of a reaction between a monoisocyanate and a monoacid, 2 in the instance of a reaction between a diisocyanate and a monoacid, 3, 4, 5, 6, and the like, with p having no necessary upper limit), urethane-ureas of the formula

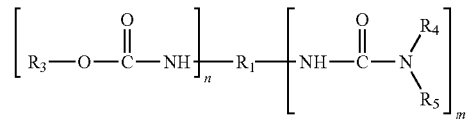

wherein n and m are as previously defined, urethane-amides of the formula

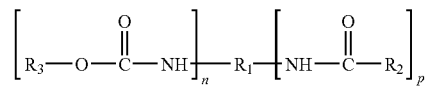

wherein n and m are as previously defined, urethanes of the formula

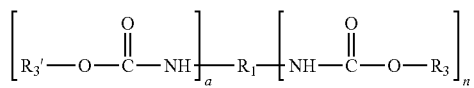

wherein n is as previously defined and a represents the number of repeat urethane functional groups having no ethylenic unsaturations therein, ureas of the formula

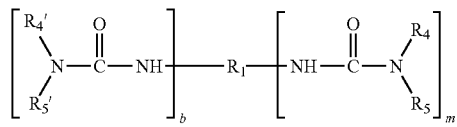

wherein m is as previously defined and b represents the number of repeat urea functional groups having no ethylenic unsaturations therein, amides of the formula

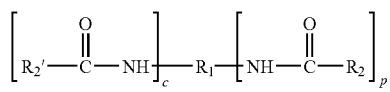

wherein p is as previously defined and c represents the number of repeat amide functional groups having no ethylenic unsaturations therein, urethane-ureas of the formula

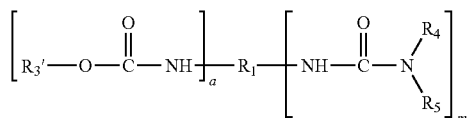

wherein a and m are as previously defined, urethane-ureas of the formula

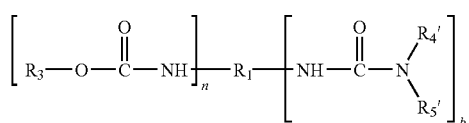

wherein b and n are as previously defined, urethane-ureas of the formula

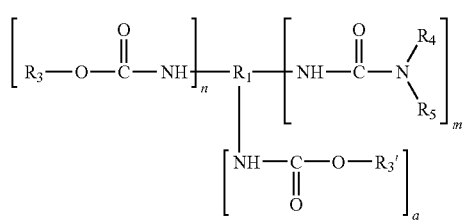

wherein a, n, and m are as previously defined, urethane-ureas of the formula

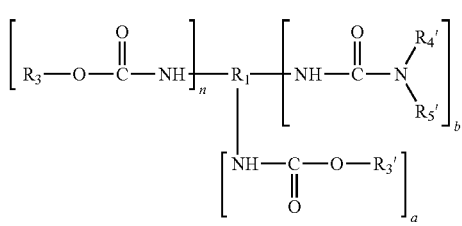

wherein a, b, and n are as previously defined, urethane-ureas of the formula

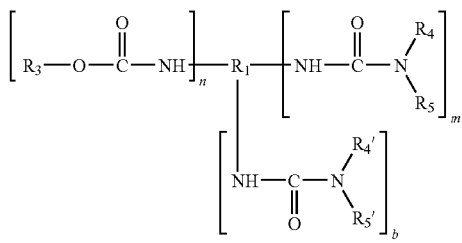

wherein b, n, and m are as previously defined, urethane-ureas of the formula

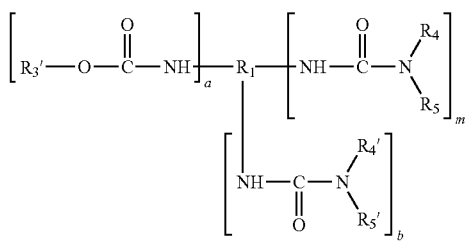

wherein a, b, and m are as previously defined, urethane-ureas of the formula

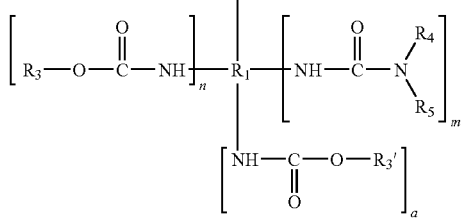

wherein a, b, m, and n are as previously defined, urethane-amides of the formula

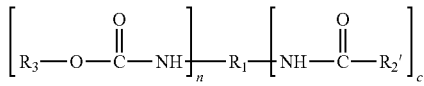

wherein n and c are as previously defined, urethane-amides of the formula

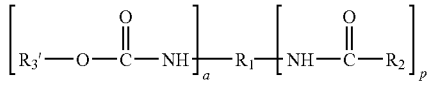

wherein a and p are as previously defined, urethane-amides of the formula

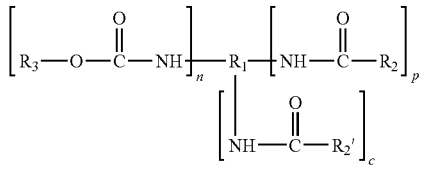

wherein n, p, and c are as previously defined, urethane-amides of the formula

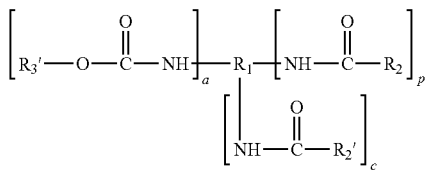

wherein a, p, and c are as previously defined, urethane-amides of the formula

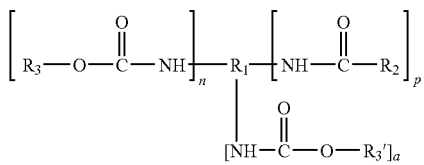

wherein a, p, and n are as previously defined, urethane-amides of the formula

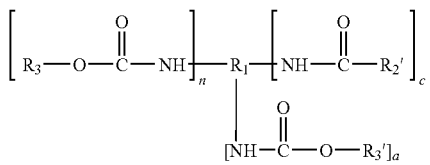

wherein a, c, and n are as previously defined, urethane-amides of the formula

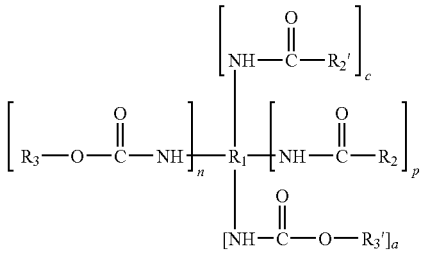

wherein a, c, p, and n are as previously defined, and the like.

Any suitable reaction conditions for making urethane, urea, or urethane/urea compounds by condensing alcohols and/or amines with isocyanates can be used to prepare the urethane, urea, urea-urethane, or amide-urethane compounds. Typically (although not necessarily), the reaction is carried out at elevated temperatures (for example, from about 45 to about 160° C.) in the presence of an optional reaction catalyst, such as dibutyl tin dilaurate, bismuth tris-neodecanoate, cobalt benzoate, lithium acetate, stannous octoate, triethylamine, or the like. In a specific embodiment, the reaction conditions are conducted in an inert atmosphere, such as argon or nitrogen gas or other suitable gases, to prevent oxidizing or yellowing of the reaction products and to prevent undesirable side reactions. The reaction can employ an inert solvent, such as toluene or the like, or can be performed neat (i.e., without a solvent). The mole ratio of reactants is adjusted so that the isocyanate functionalities are completely consumed in the reaction with a slight molar excess of alcohol and/or amine typically remaining. The reactants can be added together in any order and/or added to the reaction as physical mixtures. If desired, reaction conditions and the order of the addition of reactants can be controlled for several reasons, such as to provide a controlled exothermic reaction, to tailor the distribution of molecules when reacting a diisocyanate with a mixture of an alcohol and an amine, or the like. When doing these adjustments, the different reactivities to isocyanates of alcohols versus amines can be employed, as well as the different reactivities of the two separate isocyanate groups on diisocyanates such as isophorone diisocyanate. See, for example, J. H. Saunders and K. C. Frisch's "Polyurethanes Part I, Chemistry" published by Interscience of New York, N.Y. in 1962 and Olin Chemicals' LUXATE® IM isophorone diisocyanate technical product information sheet, the disclosures of each of which are totally incorporated herein by reference, which provide further explanation of this chemistry. By so tailoring the distribution of molecules, one can control the finished product to have a controlled viscosity that is designed for a specific application, have a controlled glass transition temperature and/or melting point, have consistent properties from batch to batch, or the like.

The reaction can be carried out either neat or, optionally, in the presence of a solvent. When present, any desired or effective solvent can be used. Examples of suitable solvents include xylene, toluene, benzene, chlorobenzene, nitrobenzene, dichlorobenzene, N-methylpyrrolidinone, dimethyl formamide, dimethyl sulfoxide, sulfolane, hexane, tetrahydrofuran, and the like, as well as mixtures thereof.

Reactions wherein isocyanates are reacted with alcohols, amines, and acids to form urethanes, ureas, and amides are also disclosed in, for example, U.S. application Ser. No.

10/260,146 (U.S. Publication 20040077887), U.S. Pat. No. 6,821,327, U.S. application Ser. Nos. 10/260,379 (U.S. Publication 20040082801), 10/369,981 (U.S. Publication 20040167249), 10/918,053, and 10/918,619, the disclosures of each of which are totally incorporated herein by reference.

Compounds as disclosed herein can be used as components in phase change ink carriers. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958, the disclosure of which is totally incorporated herein by reference.

The isocyanate-based curable compound is present in the phase change ink carrier in any desired or effective amount, in one embodiment at least about 0.1 percent by weight of the carrier, in another embodiment at least about 1 percent by weight of the carrier, and in yet another embodiment at least about 10 percent by weight of the carrier, and in one embodiment no more than about 99 percent by weight of the carrier, in another embodiment no more than about 30 percent by weight of the carrier, and in yet another embodiment no more than about 15 percent by weight of the carrier, although the amount can be outside of these ranges.

The phase change carrier composition contains a phase change inducing component. This component is referred to as a phase change inducing component because it influences the phase change transition temperature. The phase change inducing component is miscible with the other ink components and is a solid at the drum temperature at the time when the ink is jetted onto the drum in embodiments when the ink is used in printing processes wherein the substrate is an intermediate transfer member, and is a solid at the temperature of the final recording sheet in embodiments when the substrate is a final recording sheet. The phase change inducing component is a molecule with at least one hydroxyl group and has a minimum melting point of about 40° C. Examples of suitable phase change inducing components include (but are not limited to) alcohols of the formula $R_c$—OH wherein $R_c$ is (i) an alkyl group (including linear and branched, cyclic and acyclic, and substituted and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, in another embodiment with at least about 5 carbon atoms, in yet another embodiment with at least about 10 carbon atoms, and in still another embodiment with at least about 15 carbon atoms, and in one embodiment with no more than about 100 carbon atoms, in another embodiment with no more than about 80 carbon atoms, and in yet another embodiment with no more than about 60 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, in another embodiment with at least about 6 carbon atoms, and in yet another embodiment with at least about 10 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, (iii) an arylalkyl group (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, or (iv) an alkylaryl group (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, wherein the substituents on the substituted alkyl, arylalkyl, and alkylaryl groups can be (but are not limited to) hydroxy groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, mixtures thereof, and the like, wherein two or more substituents can be joined together to form a ring.

Specific examples of suitable phase change inducing alcohols include 1,10-decanediol, commercially available from Sigma-Aldrich, Milwaukee, Wis., 1,12-dodecanediol, commercially available from Sigma-Aldrich, 1,2-dodecanediol, commercially available from Sigma-Aldrich, UNILIN® 350, 425, 550, and 700, which are mixtures of linear primary alcohols with average molecular weights of about 350, 425, 550, and 700, respectively, commercially available from Baker Petrolite, Sand Springs, Okla., polycaprolactone diols, of the general formula

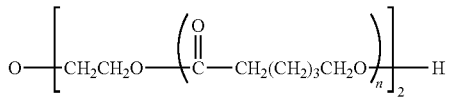

including those having $M_n$ values of about 530, 1,250, and 2,000, commercially available from Sigma-Aldrich, polycaprolactone diols, of the general formula

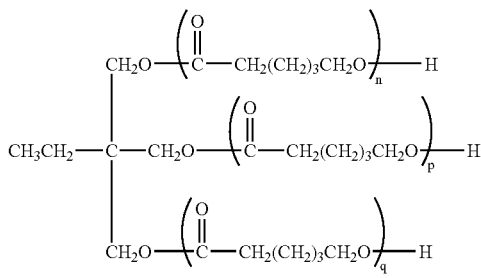

including those having $M_n$ values of about 300 and 900, commercially available from Sigma-Aldrich, heptadecanol (all isomers), octadecanol (all isomers), nonadecanol (all isomers), eicosanol ($C_{20}H_{41}OH$; all isomers), heneicosanol ($C_{21}H_{43}OH$; all isomers), docosanol ($C_{22}H_{45}OH$; all isomers), dimer diols believed to be of the formula HO—$C_{36}H_{64+n}$—OH wherein $C_{36}H_{64+n}$ is a branched alkylene group which may include unsaturations and cyclic groups, wherein n is an integer of 0, 1, 2, 3, 4, 5, 6, 7, 8, 9, or 10, including but not limited to isomers of the formulae

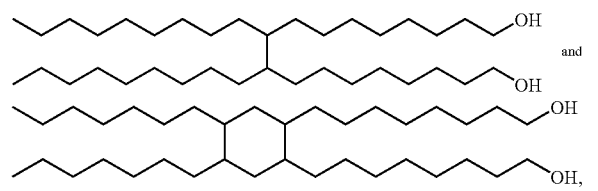

commercially available from Uniqema Chemicals, New Castle, Del., Guerbet alcohols, which are 2,2-dialkyl-1-ethanols, including (but not limited to) those of the general formula

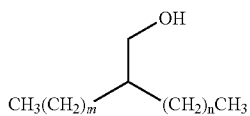

wherein m+n is greater than or equal to 10, in one embodiment being from about 16 to about 36, commercially available from Tomah Chemicals and Jarchem Industries Inc., Newark, N.J., and the like, as well as mixtures thereof.

One specific example of a phase change inducing component is hydrogenated castor oil, a triol triester believed to be of the formula

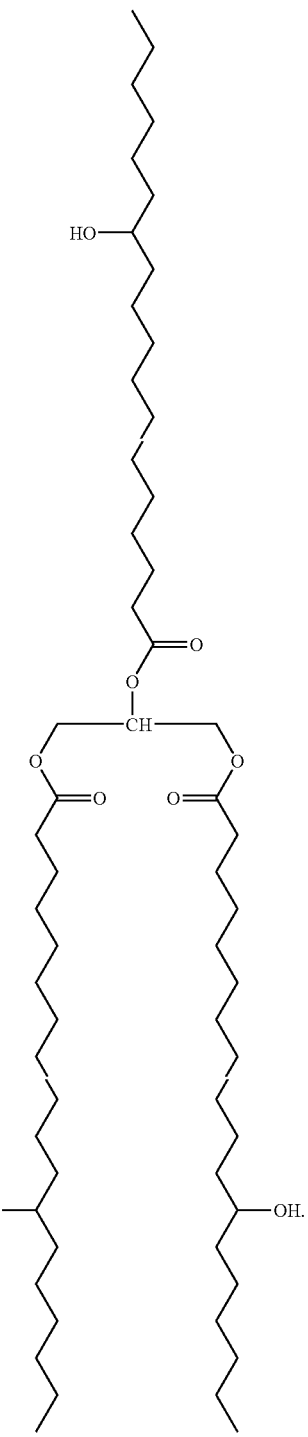

The phase change inducing component is present in the phase change ink carrier in any desired or effective amount effective to influence the phase change transition temperature, in one embodiment at least about 5 percent by weight of the carrier, in another embodiment at least about 7.5 percent by weight of the carrier, in yet another embodiment at least about 10 percent by weight of the carrier, and in still another embodiment at least about 20 percent by weight of the carrier, and in one embodiment no more than about 98 percent by weight of the carrier, in another embodiment no more than about 80 percent by weight of the carrier, in yet another embodiment no more than about 60 percent by weight of the carrier, in still another embodiment no more than about 50 percent by weight of the carrier, and in another embodiment no more than about 30 percent by weight of the carrier, although the amount can be outside of these ranges.

In one specific embodiment, the phase change carrier composition can also, if desired, contain an optional curable viscosity modifying ester. These materials can help to reduce the viscosity of the ink at jetting temperatures and, because they are equipped with ethylenic unsaturations, also enhance the curability of the ink. In addition, many esters are neutral molecules; accordingly, in embodiments not containing basic functional groups, they do not disrupt acid catalyzed cationic curing mechanisms, as would molecules containing basic functional groups, such as amides, urethanes, ureas, or the like. Examples of suitable curable viscosity modifying esters include (but are not limited to) those of the formula

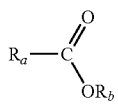

wherein $R_a$ is (i) an alkyl group (including linear and branched, cyclic and acyclic, and substituted and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 10 carbon atoms, and in yet another embodiment with at least about 16 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (ii) an arylalkyl group (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment no more than about 12 carbon atoms, although the number of carbon atoms can be outside of these ranges, or (iii) an alkylaryl group (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, and wherein $R_b$ is (i) an alkyl group having at least one ethylenic unsaturation therein (including linear and branched, cyclic and acyclic, and substituted and unsubstituted alkyl groups, and wherein hetero atoms, such as oxygen, nitrogen, sulfur, silicon, phosphorus, and the like either may or may not be present in the alkyl group), in one embodiment with at least about 5 carbon atoms, and in another embodiment with at least about 6 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (ii) an arylalkyl group having at least one ethylenic unsaturation therein (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, or (iii) an alkylaryl group having at least one ethylenic unsaturation therein (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, thiocyanato groups, isothiocyanato groups, carboxylate groups, carboxylic acid groups, urethane groups, urea groups, mixtures thereof, and the like, wherein two or more substituents can be joined together to form a ring.

Specific examples of suitable curable viscosity modifying esters include bis[4-(vinyloxy)butyl]adipate, of the formula

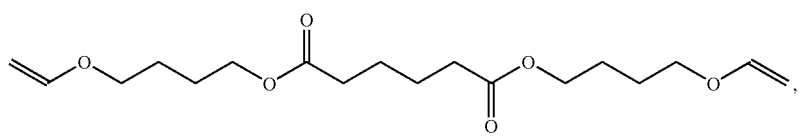

commercially available as VEctomer® 4060 and VEctomer® 4230 from Morflex Inc., Greensboro, N.C., 4-[(vinyloxy)butyl]stearate, of the formula

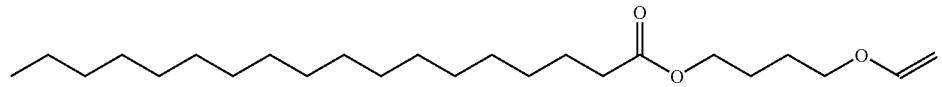

commercially available as VEctomer® 3080 from Morflex Inc., tris[4-(vinyloxy)butyl]trimellitate, of the formula

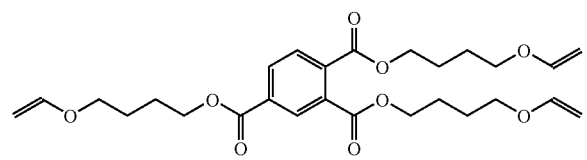

commercially available as VEctomer® 5015 from Morflex Inc., bis[4-(vinyloxy)butyl]dodecanedioate, of the formula

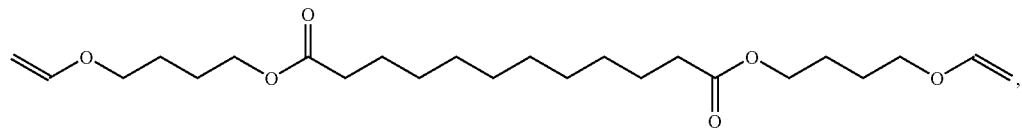

and the like, as well as mixtures thereof.

When present, the curable viscosity modifying ester is present in the phase change ink carrier in any desired or effective amount, in one embodiment at least about 0.1 percent by weight of the carrier, in another embodiment at least about 0.5 percent by weight of the carrier, and in yet another embodiment at least about 1 percent by weight of the carrier, and in one embodiment no more than about 30 percent by weight of the carrier, in another embodiment no more than about 25 percent by weight of the carrier, and in yet another embodiment no more than about 20 percent by weight of the carrier, although the amount can be outside of these ranges.

Examples of additional suitable ink carrier materials include fatty amides, such as monoamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

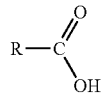

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194, 638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

The ink carrier can also optionally contain an antioxidant. The optional antioxidants protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink carrier, in another embodiment of at least about 0.1 percent by weight of the ink carrier, and in yet another embodiment of at least about 1 percent by weight of the ink carrier, and in one embodiment of no more than about 20 percent by weight of the ink carrier, in another embodiment of no more than about 5 percent by weight of the ink carrier, and in yet another embodiment of no more than about 3 percent by weight of the ink carrier, although the amount can be outside of these ranges.

The ink carrier can also optionally contain an auxiliary viscosity modifier. Examples of suitable auxiliary viscosity modifiers include aliphatic ketones, such as stearone, and the like. When present, the optional auxiliary viscosity modifier is present in the ink in any desired or effective amount, in one embodiment of at least about 0.1 percent by weight of the ink carrier, in another embodiment of at least about 1 percent by weight of the ink carrier, and in yet another embodiment of at least about 10 percent by weight of the ink carrier, and in one embodiment of no more than about 99 percent by weight of the ink carrier, in another embodiment of no more than about 30 percent by weight of the ink carrier, and in yet another embodiment of no more than about 15 percent by weight of the ink carrier, although the amount can be outside of these ranges.

Other optional additives to the ink carrier include clarifiers, such as UNION CAMP® X37-523-235 (commercially available from Union Camp), in an amount in one embodiment of at least about 0.01 percent by weight of the ink carrier, in another embodiment of at least about 0.1 percent by weight of the ink carrier, and in yet another embodiment of at least about 5 percent by weight of the ink carrier, and in one embodiment of no more than about 98 percent by weight of the ink carrier, in another embodiment of no more than about 50 percent by weight of the ink carrier, and in yet another embodiment of no more than about 10 percent by weight of the ink carrier, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink carrier, in another embodiment of at least about 5 percent by weight of the ink carrier, and in yet another embodiment of at least about 10 percent by weight of the ink carrier, and in one embodiment of no more than about 98 percent by weight of the ink carrier, in another embodiment of no more than about 75 percent by weight of the ink carrier, and in yet another embodiment of no more than about 50 percent by weight of the ink carrier, although the amount can be outside of these range, adhesives, such as VERSAMID® 757, 759, or 744 (commercially available from Henkel), in an amount in one embodiment of at least about 0.1 percent by weight of the ink carrier, in another embodiment of at least about 1 percent by weight of the ink carrier, and in yet another embodiment of at least about 5 percent by weight of the ink carrier, and in one embodiment of no more than about 98 percent by weight of the ink carrier, in another embodiment of no more than about 50 percent by weight of the ink carrier, and in yet another embodiment of no more than about 10 percent by weight of the ink carrier, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink carrier, in another embodiment of at least about 1 percent by weight of the ink carrier, and in yet another embodiment of at least about 2 percent by weight of the ink carrier, and in one embodiment of no more than about 50 percent by weight of the ink carrier, in another embodiment of no more than about 30 percent by weight of the ink carrier, and in yet another embodiment of no more than about 10 percent by weight of the ink carrier, although the amount can be outside of these ranges, and the like.

The ink compositions further contain an initiator.

Examples of free radical initiators include benzyl ketones, monomeric hydroxyl ketones, polymeric hydroxyl ketones, α-amino ketones, acyl phosphine oxides, metallocenes, benzophenone, benzophenone derivatives, and the like. Specific examples include 1-hydroxy-cyclohexylphenylketone, benzophenone, 2-benzyl-2-(dimethylamino)-1-(4-(4-morpholinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, and the like, as well as mixtures thereof.

Examples of cationic initiators include aryldiazonium salts, diaryliodonium salts, triaylsulfonium salts, triarylselenonium salts, dialkylphenacylsulfonium salts, triarylsulfoxonium salts, aryloxydiarylsulfonium salts, and the like. Specific examples include triphenylsulfonium hexaflurophosphate, methyldiphenylsulfonium hexafluorophosphate, dimethylphenylsulfonium hexaflurophosphate, diphenylnapththylsulfonium hexaflurophosphate, di(methoxynapththyl)methylsulfonium hexaflurophosphate, (4-octyloxyphenyl) phenyl iodonium hexafluoro antimonate, (4-octyloxyphenyl) diphenyl sulfonium hexafluoro antimonate, (4-decyloxyphenyl) phenyl iodonium hexafluoro antimonite, (4-dodecyloxyphenyl) diphenyl sulfonium hexafluoroantimonate, and the like, as well as mixtures thereof.

The initiator is present in the phase change ink carrier in any desired or effective amount, in one embodiment at least about 0.1 percent by weight of the carrier, in another embodiment at least about 1 percent by weight of the carrier, in yet another embodiment at least about 5 percent by weight of the carrier, and in still another embodiment at least about 10 percent by weight of the carrier, and in one embodiment no more than about 20 percent by weight of the carrier, in another embodiment no more than about 17 percent by weight of the carrier, and in yet another embodiment no more than about 15 percent by weight of the carrier, although the amount can be outside of these ranges.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change inks also contain a colorant. Any desired or effective colorant can be employed, including dyes, pigments, mixtures thereof, and the like, provided that the colorant can be dissolved or dispersed in the ink vehicle. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Neopen Blue 808 (BASF), Spectra Oil Blue ZV dyes, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks. Examples of suitable pigments include Violet Toner VT-8015 (Paul Uhlich); Paliogen Violet 5100 (BASF), Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Sigma-Aldrich); Scarlet for Thermoplast NSD PS PA (Ugine Kuhlmann of Canada); E.D. Toluidine Red (Sigma-Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Sigma-Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, Copending Application U.S. Ser. No. 10/260,146, filed Sep. 27, 2002, entitled "Colorant Compounds," and Copending Application U.S. Ser. No. 10/260,379, filed Sep. 27, 2002, entitled "Methods for Making Colorant Compounds," the disclosures of each of which are totally incorporated herein by reference.

Other ink colors besides the subtractive primary colors can be desirable for applications such as postal marking, industrial marking, and labelling using phase change printing, and the inks are applicable to these needs. Further, infrared (IR) or ultraviolet (UV) absorbing dyes can also be incorporated into the inks for use in applications such as "invisible" coding or marking of products. Examples of such infrared and ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275,647, U.S. Pat. No. 5,208,630, U.S. Pat. No. 5,202,265, U.S. Pat. No. 5,271,764, U.S. Pat. No. 5,256,193, U.S. Pat. No. 5,385,803, and U.S. Pat. No. 5,554,480, the disclosures of each of which are totally incorporated herein by reference.

In a specific embodiment, the colorant is an isocyanate-derived colored resin as disclosed in, for example, U.S. Pat. No. 5,780,528 and U.S. Pat. No. 5,919,839, the disclosures of each of which are totally incorporated herein by reference. In this embodiment, the colorant is the reaction product of a hydroxyl-substituted or primary or secondary amino-substituted chromophore with an isocyanate. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Specific examples of suitable isocyanates include those listed hereinabove as being suitable for reaction with the hydroxyl-substituted or amino-substituted antioxidant. Examples of suitable hydroxyl-substituted and primary or secondary amino-substituted chromophores include those disclosed in, for example, U.S. Pat. No. 3,157,633, U.S. Pat. No. 3,927,044, U.S. Pat. No. 3,994,835, U.S. Pat. No. 4,102,644, U.S. Pat. No. 4,113,721, U.S. Pat. No. 4,132,840, U.S. Pat. No. 4,137,243, U.S. Pat. No. 4,170,564, U.S. Pat. No. 4,284,729, U.S. Pat. No. 4,507,407, U.S. Pat. No. 4,640,690, U.S. Pat. No. 4,732,570, U.S. Pat. No. 4,751,254, U.S. Pat. No. 4,751,254, U.S. Pat. No. 4,761,502, U.S. Pat. No. 4,775,748, U.S. Pat. No. 4,812,141, U.S. Pat. No. 4,846,846, U.S. Pat. No. 4,871,371, U.S. Pat. No. 4,912,203, U.S. Pat. No. 4,978,362, U.S. Pat. No. 5,043,013, U.S. Pat. No. 5,059,244, U.S. Pat. No. 5,149,800, U.S. Pat. No. 5,177,200, U.S. Pat. No. 5,270,363, U.S. Pat. No. 5,290,921, and U.S. Pat. No. 5,731,398, the disclosures of each of which are totally incorporated herein by reference. Hydroxyl-containing and primary or secondary amino-containing colorants from the classes of Color Index (C.I.) Solvent Dyes, Disperse Dyes, modified Acid and Direct Dyes, Basic Dyes, Sulphur Dyes, Vat Dyes, and the like can also be used.

In another specific embodiment, the colorant is a curable olefin colorant such as those disclosed in U.S. Pat. No. 6,870,063, U.S. Pat. No. 6,870,062, U.S. Pat. No. 6,787,658, and U.S. patent Publication 20040142995, the disclosures of each of which are totally incorporated herein by reference.

The colorant is present in the phase change ink in any desired or effective amount to obtain the desired color or hue, in one embodiment at least about 0.1 percent by weight of the ink, in another embodiment at least about 0.2 percent by weight of the ink, and in another embodiment at least about 0.5 percent by weight of the ink, and in one embodiment no more than about 50 percent by weight of the ink, in another embodiment no more than about 20 percent by weight of the ink, in yet another embodiment no more than about 10 percent by weight of the ink, and in still another embodiment no more than about 5 percent by weight of the ink, although the amount can be outside of these ranges.

Curing of the ink can be effected by exposure of the ink image to actinic radiation at any desired or effective wavelength, in one embodiment at least about 200 nanometers, and one embodiment no more than about 480 nanometers, although the wavelength can be outside of these ranges. Exposure to actinic radiation can be for any desired or effective period of time, in one embodiment for at least about 1 second, and in another embodiment for at least about 5 seconds, and in one embodiment for no more than about 30 seconds, and in another embodiment for no more than about 15 seconds, although the exposure period can be outside of these ranges. By curing is meant that the isocyanate-based curable compound undergoes an increase in molecular weight upon exposure to actinic radiation, such as (but not limited to) crosslinking, chain lengthening, or the like.

The ink compositions in one embodiment have melting points of no lower than about 50° C., in another embodiment of no lower than about 70° C., and in yet another embodiment of no lower than about 80° C., and have melting points in one embodiment of no higher than about 120° C., in another embodiment of no higher than about 110° C., and in yet another embodiment of no higher than about 100° C., although the melting point can be outside of these ranges.

The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

For printing applications wherein the ink is printed onto an intermediate transfer member and subsequently transferred to a final substrate, the viscosity of the ink in one specific embodiment increases to about $10^6$ centipoise or greater at the intermediate transfer member temperature to facilitate adhesion to the intermediate transfer member, and for printing applications wherein the ink is printed directly onto a final substrate, the viscosity of the ink in one specific embodiment increases to $10^6$ centipoise or greater at the final substrate temperature to prevent the ink from soaking into the final substrate and/or to facilitate adhesion to the final substrate until curing by exposure to radiation. In one specific embodiment, the temperature of the intermediate transfer member or the final substrate onto which the ink is printed and at which the ink viscosity increases to about $10^6$ centipoise or greater is about 50° C. or lower.

The ink compositions can be prepared by any desired or suitable method. For example, the ink ingredients can be mixed together, followed by heating, to a temperature in one embodiment of at least about 80° C., and in one embodiment of no more than about 120° C., although the temperature can be outside of these ranges, and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I 50.0 g (0.225 mol) of isophorone diisocyanate (Desmodur I, obtained from Bayer Corp., Pittsburgh, Pa.) and 49.6 g (0.428 mol) of 1,4 butanediol vinyl ether (obtained from Sigma-Aldrich Chemical Company, Milwaukee, Wis.) were charged to a 200 ml beaker equipped with magnetic stir bar. The beaker was placed in a 110° C. silicone oil bath on a stirring hot plate and stirring was initiated. Five drops of catalyst (Fascat 4202 dibutyltindilaurate, obtained from Elf Atochem North America, Inc., Philadelphia, Pa.) were added and the mixture was allowed to react for about 2 h at 110° C. An FT-IR analysis of the reaction product indicated that almost all of the NCO functionality was consumed. 9.1 g (0.034 mol) of octadecyl alcohol (obtained from Sigma-Aldrich Chemical Co.) was added and the mixture was allowed to react for 1 additional hour. An FT-IR analysis of the reaction product indicated that all the NCO functionality was consumed. Specifically, the FT-IR showed the absence (disappearance) of a peak at about 2285 $cm^{-1}$ (NCO) and the appearance (or increase in magnitude) of peaks at about 1740-1680 $cm^{-1}$ and about 1540-1530 $cm^{-1}$ corresponding to urethane frequencies. The final urethane product was then poured into an aluminum pan and allowed to cool. This final product was characterized by a viscosity of about 16.15 cPs as measured by a Ferranti-Shirley cone-plate viscometer at about 135° C. The product was believed to be of the formula

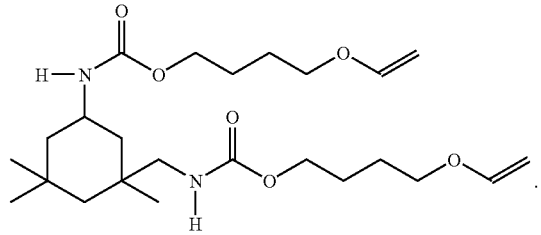

EXAMPLE II 50.0 g (0.225 mol) of isophorone diisocyanate (Desmodur I, obtained from Bayer Corp., Pittsburgh, Pa.), 81.3 g (0.225 mol) of Abitol E (hydroabietyl alcohol, obtained from Hercules Inc., Wilmington, Del.), and 26.1 g (0.225 mol) of 1,4 butanediol vinyl ether (obtained from Sigma-Aldrich Chemical Company, Milwaukee, Wis.) were charged to a 400 ml beaker equipped with magnetic stir bar. The beaker was placed in a 110° C. silicone oil bath on a stirring hot plate and stirring was initiated. Five drops of catalyst (Fascat 4202 dibutyltindilaurate, obtained from Elf Atochem North America, Inc., Philadelphia, Pa.) were added and the mixture was allowed to react for about 2 hours at 110° C. An FT-IR analysis of the reaction product indicated that all the NCO functionality was consumed. Specifically, the FT-IR showed the absence (disappearance) of a peak at about 2285 $cm^{-1}$ (NCO) and the appearance (or increase in magnitude) of peaks at about 1740-1680 $cm^{-1}$ and about 1540-1530 $cm^{-1}$ corresponding to urethane frequencies. The final urethane product was then poured into an aluminum pan and allowed to cool. This final product was characterized by a viscosity of about 97.16 cPs as measured by a Ferranti-Shirley cone-plate viscometer at about 135° C. The product was believed to be of the formula

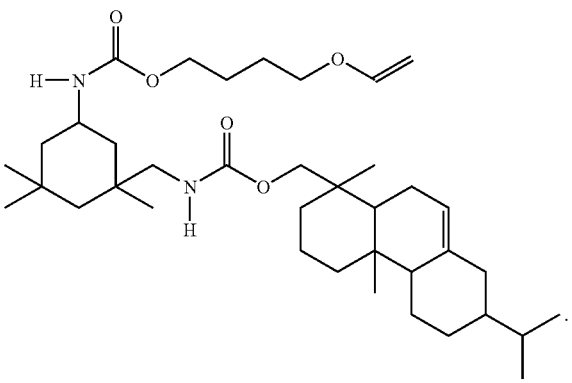

EXAMPLE III 62.3 g (0.371 mol) of hexamethylene diisocyanate (obtained from Sigma-Aldrich Chemical Co., Milwaukee, Wis.), 100.0 g (0.186 mol) of dimer diol (PRIPOL 2033, obtained from Uniqema, New Castle Del.), and 43.0 g (0.371 mol) of 1,4 butanediol vinyl ether (obtained from Sigma-Aldrich Chemical Company) were charged to a 400 ml beaker equipped with magnetic stir bar. The beaker was placed in a 110° C. silicone oil bath on a stirring hot plate and stirring was initiated. Three drops of catalyst (Fascat 4202 dibutyltindilaurate, obtained from Elf Atochem North America, Inc., Philadelphia, Pa.) were added and the mixture was allowed to react for about 2 hours at 110° C. An FT-IR analysis of the reaction product indicated that all the NCO functionality was consumed. Specifically, the FT-IR showed the absence (disappearance) of a peak at about 2285 $cm^{-1}$ (NCO) and the appearance (or increase in magnitude) of peaks at about 1740-1680 $cm^{-1}$ and about 1540-1530 $cm^1$ corresponding to urethane frequencies. The final urethane product was then poured into an aluminum pan and allowed to cool. The product was believed to be of the formula

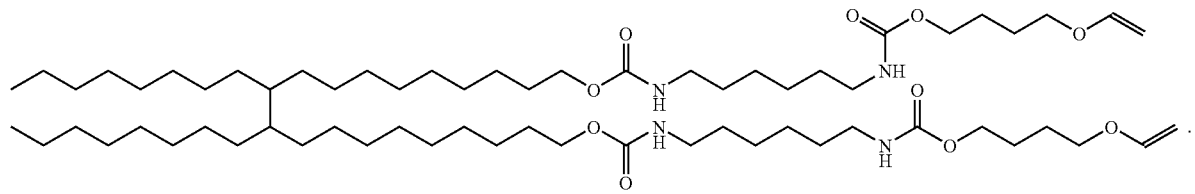

EXAMPLE IV 50.0 g (0.167 mol) of octadecyl isocyanate (Mondur O, obtained from Bayer Corp., Pittsburgh, Pa.) and 19.6 g (0.169 mol) of 1,4 butanediol vinyl ether (obtained from Sigma-Aldrich Chemical Co., Milwaukee, Wis.) were charged to a 200 ml beaker equipped with magnetic stir bar. The beaker was placed in a 110° C. silicone oil bath on a stirring hot plate and stirring was initiated. Two drops of catalyst (Fascat 4202 dibutyltindilaurate, obtained from Elf Atochem North America, Inc., Philadelphia, Pa.) were added and the mixture was allowed to react for about 2 hours at 110° C. An FT-IR analysis of the reaction product indicated that all the NCO functionality was consumed. Specifically, the FT-IR showed the absence (disappearance) of a peak at about 2285 cm$^{-1}$ (NCO) and the appearance (or increase in magnitude) of peaks at about 1740-1680 cm$^{-1}$ and about 1540-1530 cm$^{-1}$ corresponding to urethane frequencies. The final urethane product was then poured into an aluminum pan and allowed to cool. This final product was characterized by a viscosity of about 2.63 cPs as measured by a Ferranti-Shirley cone-plate viscometer at about 135° C. The product was believed to be of the formula

EXAMPLE V 50.0 g (0.167 mol) of octadecyl isocyanate (Mondur O, obtained from Bayer Corp., Pittsburgh, Pa.) and 31.0 g (0.168 mol) of undecylenic acid (obtained from Sigma-Aldrich Chemical Co., Milwaukee, Wis.) were charged to a 200 ml beaker equipped with magnetic stir bar. The beaker was placed in a 110° C. silicone oil bath on a stirring hot plate and stirring was initiated. Two drops of catalyst (Fascat 4202 dibutyltindilaurate, obtained from Elf Atochem North America, Inc., Philadelphia, Pa.) were added and the mixture was allowed to react for about 2 hours at 110° C. An FT-IR analysis of the reaction product indicated that all the NCO functionality was consumed. Specifically, the FT-IR showed the absence (disappearance) of a peak at about 2285 cm$^{-1}$ (NCO) and the appearance (or increase in magnitude) of peaks at about 1740-1680 cm$^{-1}$ and about 1540-1530 cm$^{-1}$ corresponding to urethane/amide frequencies. The final amide product was then poured into an aluminum pan and allowed to cool. This final product was characterized by a viscosity of about 5.44 cPs as measured by a Ferranti-Shirley cone-plate viscometer at about 135° C. The product was believed to be of the formula

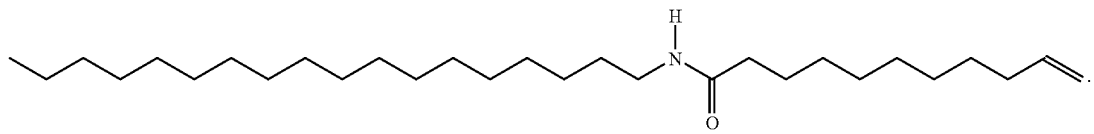

EXAMPLE VI 50.0 g (0.225 mol) of isophorone diisocyanate (Desmodur I, obtained from Bayer Corp., Pittsburgh, Pa.) and 46.0 g (0.431 mol) of 2-allyloxy ethanol (obtained from Sigma-Aldrich Chemical Co., Milwaukee, Wis.) were charged to a 200 ml beaker equipped with magnetic stir bar. The beaker was placed in a 110° C. silicone oil bath on a stirring hot plate and stirring was initiated. One drop of catalyst (Fascat 4202 dibutyltindilaurate, obtained from Elf Atochem North America, Inc., Philadelphia, Pa.) was added and the mixture was allowed to react for about 2 hours at 110° C. An FT-IR analysis of the reaction product indicated that all the NCO functionality was consumed. Specifically, the FT-IR showed the absence (disappearance) of a peak at about 2285 cm$^{-1}$ (NCO) and the appearance (or increase in magnitude) of peaks at about 1740-1680 cm$^{-1}$ and about 1540-1530 cm$^{-1}$ corresponding to urethane frequencies. The final urethane product was then poured into an aluminum pan and allowed to

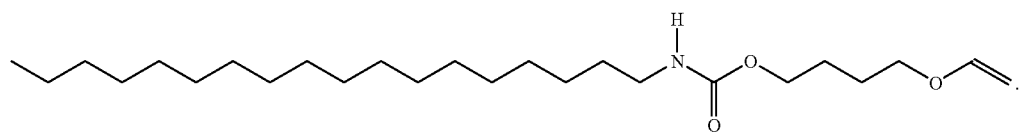

cool. This final product was characterized by a viscosity of about 13.15 cPs as measured by a Ferranti-Shirley cone-plate viscometer at about 135° C. The product was believed to be of the formula

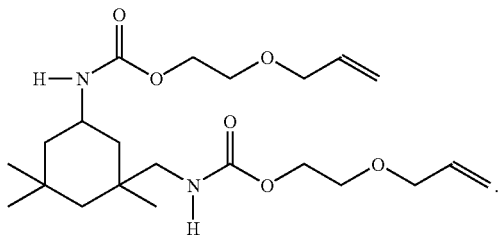

EXAMPLE VII 50.0 g (0.225 mol) of isophorone diisocyanate (Desmodur I, obtained from Bayer Corp., Pittsburgh, Pa.), 81.4 g (0.225 mol) of Abitol E (hydroabietyl alcohol, obtained from Hercules Inc., Wilmington, Del.), and 23.0 g (0.225 mol) of 2-allyloxy ethanol (obtained from Sigma-Aldrich Chemical Co., Milwaukee, Wis.) were charged to a 400 ml beaker equipped with magnetic stir bar. The beaker was placed in a 110° C. silicone oil bath on a stirring hot plate and stirring was initiated. Five drops of catalyst (Fascat 4202 dibutyltindilaurate, obtained from Elf Atochem North America, Inc., Philadelphia, Pa.) were added and the mixture was allowed to react for about 2 hours at 110° C. An FT-IR analysis of the reaction product indicated that all the NCO functionality was consumed. Specifically, the FT-IR showed the absence (disappearance) of a peak at about 2285 cm$^{-1}$ (NCO) and the appearance (or increase in magnitude) of peaks at about 1740-1680 cm$^{-1}$ and about 1540-1530 cm$^{-1}$ corresponding to urethane frequencies. The final urethane product was then poured into an aluminum pan and allowed to cool. This final product was characterized by a viscosity of about 38.81 cPs as measured by a Ferranti-Shirley cone-plate viscometer at about 135° C. The product was believed to be of the formula

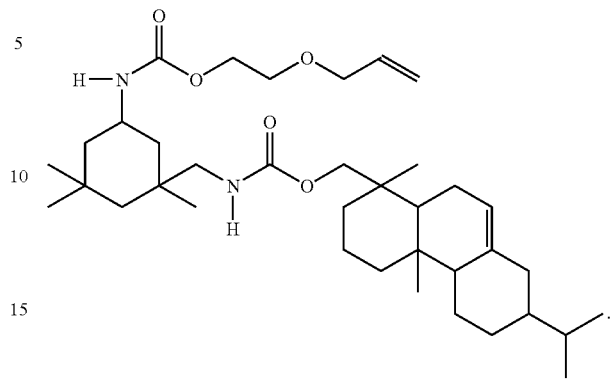

EXAMPLE VIII 52.8 g (0.178 mol) of octadecyl isocyanate (Mondur O, obtained from Bayer Corp., Pittsburgh, Pa.) and 18.2 g (0.178 mol) of allyloxy ethanol (obtained from Sigma-Aldrich Chemical Co., Milwaukee, Wis.) were charged to a 200 ml beaker equipped with magnetic stir bar. The beaker was placed in a 110° C. silicone oil bath on a stirring hot plate and stirring was initiated. One drop of catalyst (Fascat 4202 dibutyltindilaurate, obtained from Elf Atochem North America, Inc., Philadelphia, Pa.) was added and the mixture was allowed to react for about 2 hours at 110° C. An FT-IR analysis of the reaction product indicated that all the NCO functionality was consumed. Specifically, the FT-IR showed the absence (disappearance) of a peak at about 2285 cm$^{-1}$ (NCO) and the appearance (or increase in magnitude) of peaks at about 1740-1680 cm$^{-1}$ and about 1540-1530 cm$^{-1}$ corresponding to urethane frequencies. The final urethane product was then poured into an aluminum pan and allowed to cool. This final product was characterized by a viscosity of about 2.63 cPs as measured by a Ferranti-Shirley cone-plate viscometer at about 135° C. The product was believed to be of the formula

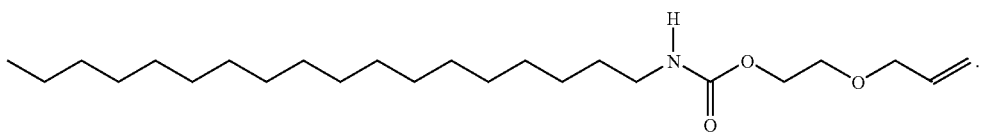

EXAMPLE IX 50.0 g (0.238 mol) of trimethyl-1,6-diisocyanatohexane (obtained from Sigma-Aldrich Chemical Co., Milwaukee, Wis.) and 55.2 g (0.476 mol) of 1,4-butanediol vinyl ether (obtained from Sigma-Aldrich Chemical Co.) were charged to a 200 ml beaker equipped with magnetic stir bar. The beaker was placed in a 110° C. silicone oil bath on a stirring hot plate and stirring was initiated. Five drops of catalyst (Fascat 4202 dibutyltindilaurate, obtained from Elf Atochem North America, Inc., Philadelphia, Pa.) were added and the mixture was allowed to react for about 2 hours at 110° C. An FT-IR analysis of the reaction product indicated that all the NCO functionality was consumed. Specifically, the FT-IR showed the absence (disappearance) of a peak at about 2285 cm$^{-1}$ (NCO) and the appearance (or increase in magnitude) of peaks at about 1740-1680 cm$^{-1}$ and about 1540-1530 cm$^{-1}$ corresponding to urethane frequencies. The final urethane product was then poured into an aluminum pan and allowed to cool. The product was believed to be of the formulae

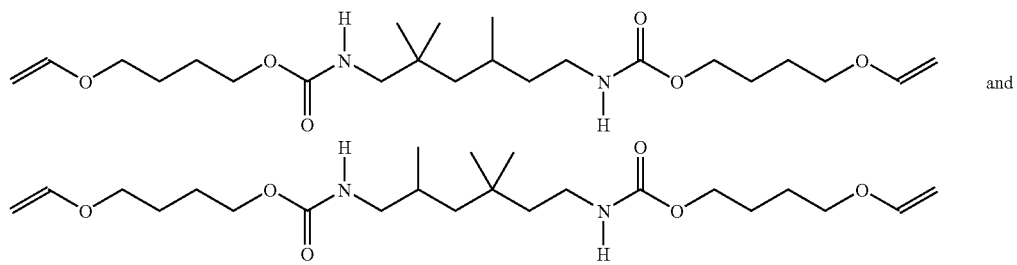

and

EXAMPLE X 50.0 g (0.298 mol) of hexamethylene diisocyanate (obtained from Sigma-Aldrich Chemical Co., Milwaukee, Wis.) and 69.0 g (0.595 mol) of 1,4-butanediol vinyl ether (obtained from Sigma-Aldrich Chemical Co.) were charged to a 200 ml beaker equipped with magnetic stir bar. The beaker was placed in a 110° C. silicone oil bath on a stirring hot plate and stirring was initiated. Five drops of catalyst (Fascat 4202 dibutyltindilaurate, obtained from Elf Atochem North America, Inc., Philadelphia, Pa.) were added and the mixture was allowed to react for about 2 hours at 110° C. An FT-IR analysis of the reaction product indicated that all the NCO functionality was consumed. Specifically, the FT-IR showed the absence (disappearance) of a peak at about 2285 cm$^{-1}$ (NCO) and the appearance (or increase in magnitude) of peaks at about 1740-1680 cm$^{-1}$ and about 1540-1530 cm$^{-1}$ corresponding to urethane frequencies. The final urethane product was then poured into an aluminum pan and allowed to cool. The product was believed to be of the formula

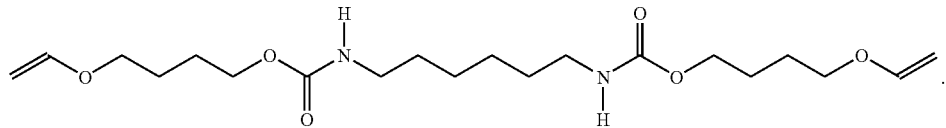

EXAMPLE XI

The process of Example V is repeated except that the undecylenic acid is replaced with 28.6 g (0.168 mol) of 9-decenoic acid (available from Sigma-Aldrich Chemical Co., Milwaukee, Wis.). It is believed that the product will be of the formula

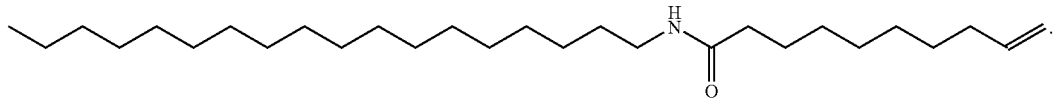

EXAMPLE XII

About 117.7 g (1.351 moles) of monoethanolamine vinyl ether (available from Alash Ltd., Temirtau, Kazakhstan) is added to a 1 L four-neck resin kettle equipped with a Trubore stirrer, an $N_2$ atmosphere inlet, addition funnel (200 mL), and thermocouple-temperature controller. The kettle is then heated to about 70° C. with stirring under an $N_2$ atmosphere and 150 g (0.676 moles) of isophorone diisocyanate (Desmodur I, available from Bayer Corp., Pittsburgh, Pa.) is added to the addition funnel. Isophorone diisocyanate is then added dropwise to the monoethanolamine vinyl ether over 2 hours and the temperature is gradually increased to about 165° C. as the viscosity increases. The contents are held at about 165° C. for 1 hour and an FT-IR of the product is run to ensure that all of the NCO functionality is consumed. The absence (disappearance) of a peak at about 2285 $cm^{-1}$ (NCO) and the appearance (or increase in magnitude) of peaks at about 1705-1635 $cm^{-1}$ and about 1515-1555 $cm^{-1}$ corresponding to urea frequencies are used to confirm completion of the reaction. The final di-urea resin product is poured into aluminum molds and allowed to cool and harden. It is believed that the product will be of the formula

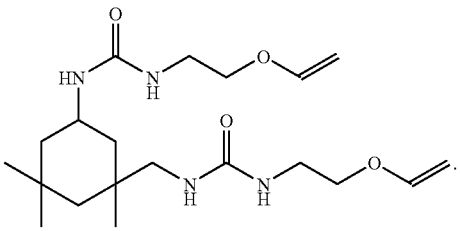

EXAMPLE XIII

The process of Example XII is repeated, adjusting the amount of monoethanolamine vinyl ether to about 58.9 g (0.676 mol) and replacing isophorone diisocyanate with about 199.8 g (0.676 mol) of octadecyl isocyanate (available from Sigma-Aldrich Chemical Company, Milwaukee, Wis.). It is believed that the product will be of the formula

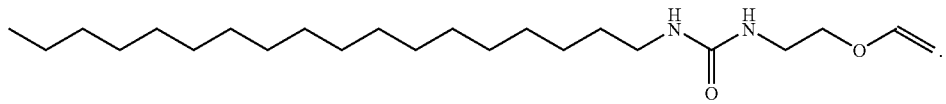

EXAMPLE XIV 39.3 g (0.338 moles) of 1,4-butanediol vinyl ether (available from Sigma-Aldrich Chemical Co., Milwaukee, Wis.) and about 75.1 g (0.338 moles) of isophorone diisocyanate (Desmodur I, available from Bayer Corp, Pittsburgh, Pa.) is added to a 500 mL three-neck resin kettle equipped with a Trubore stirrer, an $N_2$ atmosphere inlet, and a thermocouple-temperature controller. Thereafter, agitation is begun, 0.22 grams of catalyst (Fascat 4202; dibutyltindilaurate, available from Elf Atochem North America, Inc., Philadelphia, Pa.) is added, and the reaction mixture is heated to 90° C. under an $N_2$ atmosphere. After 1 hour at 90° C., the temperature is increased to 110° C. and held for 2 hours. 91.1 grams (0.338 moles) of octadecylamine (available from Sigma-Aldrich Chemical Co.) is then added and the temperature is raised to 130° C. and held there for 2 hours. An FT-IR of the reaction product is thereafter run to ensure that all of the NCO functionality is consumed. The absence (disappearance) of a peak at about 2285 $cm^{-1}$ (NCO) and the appearance (or increase in magnitude) of peaks at about 1705-1635 $cm^{-1}$ and about 1515-1555 $cm^{-1}$ corresponding to urea frequencies and about 1740-1680 $cm^{-1}$ and about 1540-1530 $cm^{-1}$ corresponding to urethane frequencies are used to confirm completion of the reaction. The final mixed urethane/urea resin product is poured into aluminum molds and allowed to cool and harden. It is believed that the product will be of the formula

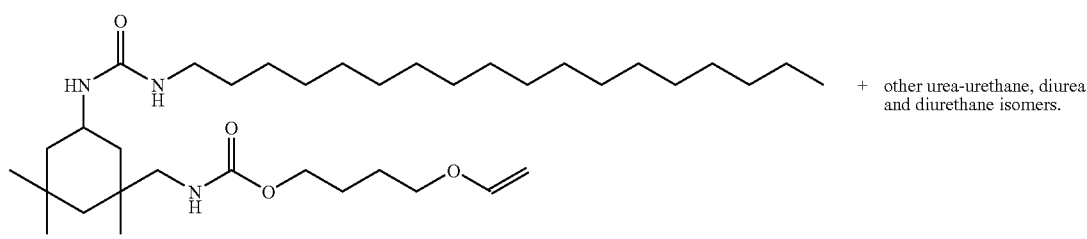

+ other urea-urethane, diurea and diurethane isomers.

EXAMPLE XV

The process of Example XIV is repeated except that the 1,4-butanediol vinyl ether is replaced with about 34.5 g (0.338 moles) of 2-allyloxy ethanol (available from Sigma-Aldrich Chemical Co., Milwaukee, Wis.). It is believed that the product will be of the formula

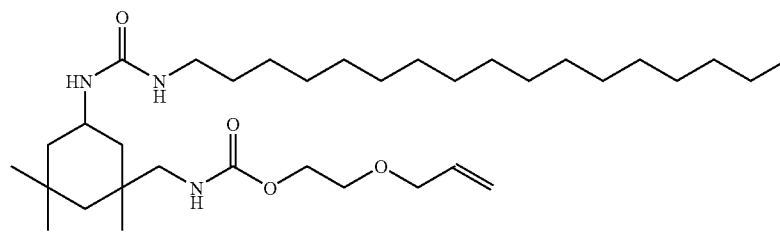

+ other urea-urethane, diurea and diurethane isomers.

$^1$H NMR (300 MHz, CDCl$_3$): δ6.47 (2H, dd, J=14.3, 6.8 Hz), 4.19 (2H, dd, J=14.3, 1.9 Hz), 4.10 (4H, br. t, J=6.0 Hz), 4.00 (2H, dd, J=6.8, 1.9 Hz), 3.70 (4H, br. t, J=5.7 Hz), 2.29 (4H, t, J=7.5 Hz), 1.76-1.71 (8H, m), 1.63-1.56 (4H, m), 1.28 (12H, br. s).

EXAMPLE XVI

Synthesis of Bis[4-(vinvioxy)butyl]dodecanedioate

To a 1 liter, two neck flask equipped with a stir bar, argon inlet, and stopper was added dodecanedioic acid (10.0 grams, 43 mmol, obtained from Sigma-Aldrich, Milwaukee, Wis.), 1,4-butanediol vinyl ether (10.1 grams, 87 mmol, obtained from Sigma-Aldrich), 4-(dimethylamino)pyridine (1.07 gram, 8.8 mmol, obtained from Sigma-Aldrich), 1-hydroxybenzotriazole (1.18 gram, 8.7 mmol, obtained from Sigma-Aldrich) and methylene chloride (500 milliliters). The reaction mixture was cooled to 0° C. and 1-[3-(dimethylamino)propyl]-3-ethylcarbodiimide hydrochloride (16.6 grams, 87 mmol, obtained from Sigma-Aldrich) was added portionwise. The reaction mixture was stirred at 0° C. for 0.5 hour, followed by stirring at room temperature until the reaction was deemed complete by $^1$H NMR spectroscopy in DMSO-d$_6$ (about 2 hours); the signal corresponding to the methylene protons alpha to the carbonyl groups of 1,12-dodecanedioc acid (4H, triplet at δ2.18) was consumed and was replaced by a triplet at δ2.27 (4H), corresponding to [H$_2$C=CHO(CH$_2$)$_4$OOCCH$_2$(CH$_2$)$_4$]$_2$. The reaction mixture was then concentrated in vacuo and the residue was dissolved in ethyl acetate (300 milliliters). The organic layer was washed with saturated sodium bicarbonate (2×150 milliliters) and water (2×150 milliliters), dried over anhydrous sodium sulfate, filtered, and concentrated in vacuo. The crude product was recrystallized from methanol to afford 13.5 grams (73 percent yield) of a white solid (mp=42-43° C.). The product was believed to be of the formula

EXAMPLE XVII

Synthesis of Bis[4-(vinvioxy)butyl]trimethyl-1,6-hexanedivibiscarbamate (mixture of 2,2,4- and 2,4,4-isomers)

To a 2 liter three neck flask equipped with a stopper, dropping funnel, stir bar, and reflux condenser was added trimethyl-1,6-diisocyanatohexane (mixture of 2,2,4- and 2,4,4-isomers, 118.7 grams, 0.57 mol, obtained from Sigma-Aldrich, Milwaukee, Wis.), dibutyltin dilaurate (3.56 grams, 5.6 mmol, obtained from Sigma-Aldrich) and anhydrous tetrahydrofuran (1 liter). 1,4-Butanediol vinyl ether (133.2 grams, 1.2 mol, obtained from Sigma-Aldrich) was added slowly dropwise to the stirring solution via the addition funnel. The reaction mixture was brought to reflux and was kept at this temperature until deemed complete by infrared spectroscopy (about 5 hours, confirmed by the disappearance of the isocyanate peak at 2200 cm$^{-1}$). When the reaction was complete, methanol (500 milliliters) was added to quench any residual isocyanate and the solution was stirred for 0.5 hour. The solvent was stripped in vacuo and the residual oil was triturated with hexane (3×500 milliliters), dissolved in methylene chloride (1 liter), washed with water (1×750 milliliters), dried over anhydrous magnesium sulfate, filtered, and concentrated in vacuo to afford 221 grams of a pale yellow oil (89 percent yield). The product was believed to be a mixture of compounds of the formulae

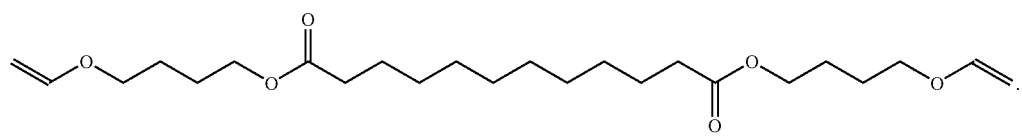

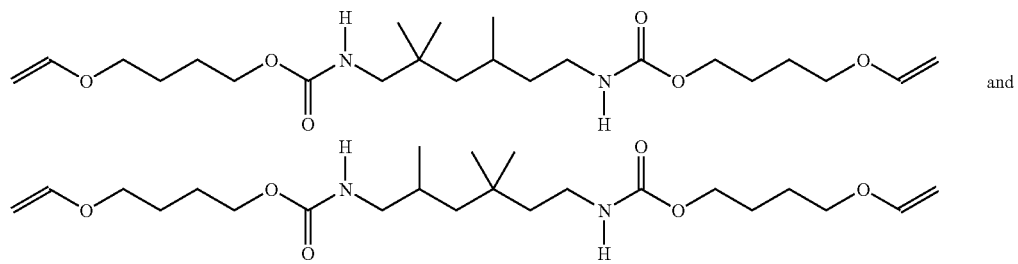 and $^1$H NMR (300 MHz, CDCl$_3$): δ56.47 (2H, dd, J=14.3, 6.8 Hz), 4.88-4.62 (2H, br. m), 4.19 (2H, dd, J=14.3, 1.8 Hz), 4.09 (4H, br. s), 4.00 (2H, dd, J=6.8, 1.8 Hz), 3.70 (4H, br. s), 3.18-2.91 (4H, m), 1.72-1.01 (13H, m), 1.01-0.88 (9H, m).

INK EXAMPLE A

To an aluminum pan was added 59.35 grams of bis[4-(vinyloxy)butyl]trimethyl-1,6-hexanediylbiscarbamate (mixture of 2,2,4- and 2,4,4-isomers, prepared as described in Example XVII), 12.49 grams of bis[4-(vinyloxy)butyl]dodecanedioate (prepared as described in Example XVI), 8.29 grams of R-GEN® BF-1172 (cationic photoinitiator; substituted triarylsulfonium hexafluorophosphate salt in propylene carbonate as a 40% solution; obtained from Chitec Chemical Co., Ltd., Taiwan, R.O.C.), 11.45 grams of VEctomer® 5015 (obtained from Sigma-Aldrich, Milwaukee, Wis.) and 12.50 grams of 1-octadecanol (obtained from Sigma-Aldrich). The mixture was heated with stirring at 100° C. until visually homogenous (about 1 hour). At this point, 0.94 grams of Neopen Blue 808 dye (obtained from BASF Aktiengesellschaft, Ludwigshafen, Germany) was added and the mixture was stirred with heating for an additional 1 hour.

INK EXAMPLE B

To an aluminum pan was added 55.82 grams of bis[4-(vinyloxy)butyl]trimethyl-1,6-hexanediylbiscarbamate (mixture of 2,2,4- and 2,4,4-isomers, prepared as described in Example XVII), 10.93 grams of bis[4-(vinyloxy)butyl]dodecanedioate (prepared as described in Example XVI) and 31.74 grams of hydrogenated Castor oil (obtained from Campbell and Co., Charlemont, Mass.). The mixture was heated at 110° C. until all ingredients dissolved (about 0.5 hour). The temperature was then lowered to 100° C., 10.95 grams of R-GEN® BF-1172 (cationic photoinitiator; substituted triarylsulfonium hexafluorophosphate salt in propylene carbonate as a 40% solution; obtained from Chitec Chemical Co., Ltd., Taiwan, R.O.C.) was added, and the reaction mixture was stirred until homogeneous (about 0.5 hour). At this point, 0.55 grams of Red Olefin Dye 24900 (obtained from Eastman Chemical Company, Kingsport, Tenn.) was added and the mixture was stirred with heating for an additional 1 hour.

INK EXAMPLE C

To an aluminum pan was added 88.55 grams of bis[4-(vinyloxy)butyl]trimethyl-1,6-hexanediylbiscarbamate (mixture of 2,2,4- and 2,4,4-isomers, prepared as described in Example XVII) and 15.02 grams of R-GEN® BF-1172 (cationic photoinitiator; substituted triarylsulfonium hexafluorophosphate salt in propylene carbonate as a 40% solution; obtained from Chitec Chemical Co., Ltd., Taiwan, R.O.C.). The mixture was stirred at 100° C. until homogenous (about 0.5 hour). The temperature was then raised to 110° C., 45.02 grams of 1-octadecanol (obtained from Sigma-Aldrich, Milwaukee, Wis.) was added, and the reaction mixture was stirred until homogeneous (about 15 minutes), after which time 1.52 grams of Red Olefin Dye 24900 (obtained from Eastman Chemical Company, Kingsport, Tenn.) was added and the reaction mixture was stirred for an additional 1 hour.

INK EXAMPLE D

To an aluminum pan was added 67.49 grams of bis[4-(vinyloxy)butyl]trimethyl-1,6-hexanediylbiscarbamate (mixture of 2,2,4- and 2,4,4-isomers, prepared as described in Example XVII), 6.25 grams of VEctomer® 3080 (obtained from Sigma-Aldrich, Milwaukee, Wis.), and 12.54 grams of R-GEN® BF-1172 (cationic photoinitiator; substituted triarylsulfonium hexafluorophosphate salt in propylene carbonate as a 40% solution; obtained from Chitec Chemical Co., Ltd., Taiwan, R.O.C.). The reaction mixture was heated at 90° C. with stirring until homogeneous (about 15 minutes). At this point, the temperature was raised to 100° C., 37.50 grams of 1-octadecanol was added, and the mixture was stirred until homogeneous (about 0.5 hour), after which time 1.25 grams of Blue Olefin Dye 24316 (obtained from the Eastman Chemical Company, Kingsport, Tenn.) was added and the formulation was stirred for 1 hour longer.

The rheological profiles were measured for Inks A through D on a Rheometrics cone-plate viscometer. In each case, the inks exhibited jettable complex viscosities (10 to 12 centipoise) at a temperature between 80 and 120° C. and an increase in complex viscosity to $\geq 10^5$ centipoise at the drum temperature (i.e., the temperature of the drum when the ink is jetted thereon) ($\leq 40°$ C.). Complex viscosity (centipoise) versus temperature (° C.) was as follows:

| Temperature | Ink A | Ink B | Ink C | Ink D |
|---|---|---|---|---|
| 110 | 10.367 | 11.758 | 9.6211 | 6.218 |
| 100 | 13.842 | 16.103 | 12.135 | 7.7432 |
| 90 | 18.805 | 22.779 | 16.92 | 10.285 |
| 80 | 26.59 | 32.869 | 24.141 | 14.281 |
| 70 | 39.22 | 50.715 | 35.841 | 20.782 |
| 60 | 61.247 | 50.715 | 55.48 | 31.287 |
| 50 | 102.05 | 1.99E+05 | 3970.3 | 8.16E+05 |
| 40 | 1.35E+05 | 1.43E+06 | 2.42E+06 | 2.14E+06 |
| 30 | 8.72E+05 | 1.02E+06 | 5.16E+06 | 2.14E+06 |

Complex viscosity is the typical measurement provided by a reciprocating plate rheometer. Such a rheometer provides a periodic measurement of viscosity at various plate rotation frequencies, ω, rather than the transient measurement of, for instance, a capillary viscometer. The reciprocating plate rheometer is able to measure both the in phase and out of phase fluid response to stress or displacement. The complex viscosity, $\eta^*$, is defined as $\eta^* = \eta' - i\eta''$; where $\eta' = G''/\omega$, $\eta'' = G'/\omega$ and i is $\sqrt{-1}$.

Inks A, B, and C were successfully jetted using a PHASER® 860 printer modified to change the intermediate transfer drum temperature, paper preheating temperature, and ink heating temperature and printed via transfuse onto LUSTROGLOSS® (Sappi Warren Papers) glossy coated paper and HAMMERMILL® (International Paper) and XEROX® 4024 uncoated papers. All of the prints showed evidence of UV-induced polymerization (i.e., an increase in robustness as determined by rub and scratch) when exposed to light from a UV Fusion LC-6B Benchtop Conveyor equipped with UV Fusion F300S Ultraviolet Lamp System employing an "H" bulb for about 3 seconds.

INK EXAMPLES E, F, AND G

Ink compositions were prepared by admixing a mixture of isomers (bis[4-(vinyloxy)butyl]trimethyl-1,6-hexanediylbiscarbamate (mixture of 2,2,4- and 2,4,4-isomers)) prepared as described in Examples 1× and XVII, a phase change agent (either hydrogenated castor oil, obtained from Campbell and Co., Charlemont, Mass.) or 1-octadecanol, obtained from Sigma-Aldrich), in one instance a viscosity-modifying ester (bis[4-(vinyloxy)butyl]dodecanedioate, prepared as described in Example XVI, a photoinitiator (R-GEN® BF-1172; cationic photoinitiator; substituted triarylsulfonium hexafluorophosphate salt in propylene carbonate as a 40% solution; obtained from Chitec Chemical Co., Ltd., Taiwan, R.O.C.), and a colorant (either Spectra Oil Blue ZV, obtained from Spectra Colors Corp., Kearny, N.J., or Blue Olefin Dye 24316, obtained from Eastman Chemical Co., Kingsport, Tenn.). The specific ink ingredients and amounts (weight percent) are shown in the following table:

|  | Ink E | Ink F | Ink G |
|---|---|---|---|
| bis[4-(vinyloxy)butyl]trimethyl-1,6-hexanediylbiscarbamate (mixture of 2,2,4- and 2,4,4- isomers) | 50 | 59 | 54 |
| hydrogenated castor oil | 29 | 0 | 0 |
| 1-octadecanol | 0 | 30 | 40 |
| bis[4-(vinyloxy)butyl]dodecanedioate | 10 | 0 | 0 |
| R-GEN ® BF-1172 (photoinitiator) | 10 | 10 | 5 |
| Spectra Oil Blue ZV | 1 | 0 | 0 |
| BlueOlefin Dye 24316 | 0 | 1 | 1 |

The rheological profiles were measured for Inks A through D on a Rheometrics cone-plate viscometer. Complex viscosity (centipoise) versus temperature (° C.) was as follows:

| Temperature | Ink E | Ink F | Ink G |
|---|---|---|---|
| 120 | 7.9225 | 6.8884 | 6.4559 |
| 110 | 10.654 | 9.135 | 5.6788 |
| 100 | 14.242 | 12.327 | 7.2463 |
| 90 | 19.715 | 17.059 | 10.139 |
| 80 | 28.705 | 24.061 | 14.14 |
| 70 | 43.487 | 35.63 | 20.133 |
| 60 | 7692.1 | 54.874 | 31.081 |
| 50 | 1.38E+05 | 6.61E+05 | 1.15E+06 |
| 40 | 8.61E+05 | 6.92E+06 | 1.08E+07 |
| 30 | 1.59E+06 | 1.11E+07 | 1.11E+07 |

After filtration to 6 microns, Ink G was jetted using a PHASER® 860 printer modified to change the intermediate transfer drum temperature, paper preheating temperature, and ink heating temperature and printed at 103° C. directly onto paper attached to an intermediate transfer member at 30° C. The ink was successfully jetted onto LUSTROGLOSS® (Sappi Warren Papers) glossy coated paper and HAMMERMILL® (International Paper) and XEROX® 4024 uncoated papers. The amount of showthrough (degree to which the printed image was visible on the surface of the paper opposite to that on which the image was printed) increased as follows: LUSTROGLOSS® <HAMMERMILL® <XEROX® 4024. In each case, an increase in robustness was observed when the prints were exposed to light from a UV Fusion LC-6B Benchtop Conveyor equipped with UV Fusion F300S Ultraviolet Lamp System employing an "H" bulb for about 15 seconds.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink comprising a colorant, an initiator, and a phase change ink carrier, said carrier comprising (A) a compound which is the reaction product of a mixture comprising (1) an isocyanate; and (2) a component comprising (a) (i) an alcohol having at least one vinyl ether group, and (ii) an amine having at least one vinyl ether group or an acid having at least one vinyl ether group; (b) an amine having at least one vinyl ether group; (c) an acid having at least one vinyl ether group; or (d) mixtures thereof, and (B) a phase change inducing component, said phase change inducing component containing at least one hydroxyl group, said phase change inducing component having a melting point of about 40° C. or higher, wherein the phase change ink has a viscosity of about 12 centipoise or lower at a temperature of between about 80° C. and about 120° C., and a viscosity of greater than about $10^5$ centipoise at a temperature of about 40° C. or lower.

2. An ink according to claim 1 wherein the isocyanate is of the formula $R_1$—$(NCO)_n$ wherein $R_1$ is (i) an alkyl or alkylene group, including linear and branched, saturated and unsaturated, cyclic and acyclic, and substituted and unsubstituted alkyl and alkylene groups, and wherein hetero atoms either may or may not be present in the alkyl or alkylene group, (ii) an aryl or arylene group, including substituted and unsubstituted aryl and arylene groups, and wherein hetero atoms either may or may not be present in the aryl or arylene group, (iii) an arylalkyl or arylalkylene group, including substituted and unsubstituted arylalkyl and arylalkylene groups, wherein the alkyl portion of the arylalkyl or arylalkylene group can be linear or branched, saturated or unsaturated, cyclic or acyclic, and substituted or unsubstituted, and wherein hetero atoms either may or may not be present in either the aryl or the alkyl portion of the arylalkyl or arylalkylene group, or (iv) an alkylaryl or alkylarylene group, including substituted and unsubstituted alkylaryl and alkylarylene groups, wherein the alkyl portion of the alkylaryl or alkylarylene group can be linear or branched, saturated or unsaturated, cyclic or acyclic, and substituted or unsubstituted, and wherein hetero atoms either may or may not be present in either the aryl or the alkyl portion of the alkylaryl or alkylarylene group, and wherein n is an integer representing the number of isocyanate groups.

3. An ink according to claim 1 wherein the isocyanate is octadecylisocyanate, hexadecylisocyanate, octylisocyanate, butylisocyanate, cyclohexyl isocyanate, adamantyl isocyanate, ethylisocyanatoacetate, ethoxycarbonylisocyanate, phenylisocyanate, alphamethylbenzyl isocyanate, phenylcyclopropyl isocyanate, benzylisocyanate, ethylphenylisocyanate, benzoylisocyanate, tolylisocyanate, nitrophenylisocyanate, ethoxyphenyl isocyanate, methoxyphenyl isocyanate, methoxyphenylisocyanate, ethyl isocyanatobenzoate, dimethylphenylisocyante, naphthylisocyanate, (naphthyl)ethylisocyante, isophorone diisocyanate, toluene diisocyanate, diphenylmethane diisocyanate, hydrogenated diphenylmethane diisocyanate, tetra-methyl xylene diisocyanate, hexamethylene diisocyanate, naphthalene diisocyanate, dimethoxy biphenyldiisocyanate, dimethyl bimethyl biphenyldiisocyanate, phenylene diisocyanate, biphenyldiisocyanate, trimethyihexamethylene diisocyanate, tetramethylene xylene diisocyanate, methylenebis(diethylphenyl isocyanate), diisocyanatododecane, diisocyanato methylpentane, diisocyanatobutane, dimer diisocyanate, cyclohexylene diisocyanate, uretidione dimers of hexamethylene-1,6-diisocyanate, trimethylolpropane trimer of toluene diisocyanate, isocyanurate trimers of toluene diisocyanate, isocyanurate trimers of hexamethylene-1,6-diisocyanate, isocyanurate trimers of isophorone diisocyanate, biuret trimers of toluene diisocyanate, biuret trimers of hexamethylene-1,6-diisocyanate, biuret trimers of isophorone diisocyanate, copolymers of toluene diisocyanate and hexamethylene-1,6-diisocyanate, diphenylmethane-4,4'-diisocyanate oligomers, or mixtures thereof.

4. An ink according to claim 1 wherein the isocyanate is trimethyl-1,6-diisocyanatohexane, isophorone diisocyanate, hexamethylene diisocyanate, octadecyl isocyanate, or mixtures thereof.

5. An ink according to claim 1 wherein the isocyanate is trimethyl-1,6-diisocyanatohexane.

6. An ink according to claim 1 wherein the compound is the reaction product of a mixture comprising (1) an isocyanate; and (2) a component comprising an acid having at least one vinyl ether group.

7. An ink according to claim 6 wherein the acid is of the formula $R_1$—COOH wherein $R_1$ is (i) an alkyl group having at least one vinyl ether group therein, including linear and branched, cyclic and acyclic, and substituted and unsubstituted alkyl groups, (ii) an arylalkyl group having at least one vinyl ether group therein, including substituted and unsubstituted arylalkyl groups, wherein the alkyl portion of the arylalkyl group can be linear or branched, cyclic or acyclic, and substituted or unsubstituted, or (iii) an alkylaryl group having at least one vinyl ether group therein, including substituted and unsubstituted alkylaryl groups, wherein the alkyl portion of the alkylaryl group can be linear or branched, cyclic or acyclic, and substituted or unsubstituted.

8. An ink according to claim 6 wherein the mixture further contains an acid containing no ethylenic unsaturations.

9. An ink according to claim 1 wherein the alcohol is of the formula $R_3$—OH wherein $R_3$ is (i) an alkyl group having at least one vinyl ether group therein, including linear and branched, cyclic and acyclic, and substituted and unsubstituted alkyl groups, (ii) an arylalkyl group having at least one vinyl ether group therein, including substituted and unsubstituted arylalkyl groups, wherein the alkyl portion of the arylalkyl group can be linear or branched, cyclic or acyclic, and substituted or unsubstituted, or (iii) an alkylaryl group having at least one vinyl ether group therein, including substituted and unsubstituted alkylaryl groups, wherein the alkyl portion of the alkylaryl group can be linear or branched, cyclic or acyclic, and substituted or unsubstituted.

10. An ink according to claim 1 wherein the alcohol is 1,4-butanediol vinyl ether, 2-allyloxyethanol, 1,4-cyclohexanedimethanol vinyl ether, ethylene glycol vinyl ether, di(ethylene glycol) vinyl ether, or mixtures thereof.

11. An ink according to claim 1 wherein the alcohol is 1,4butanediol vinyl ether, 2-allyloxy ethanol, or mixtures thereof.

12. An ink according to claim 1 wherein the mixture further contains an alcohol containing no ethylenic unsaturations.

13. An ink according to claim 12 wherein the alcohol containing no ethylenic unsaturations is methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, heneicosanol, docosanol, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, benzyl alcohol, octylphenol alkoxylates of octylphenol, nonylphenol alkoxylates of octylphenol, dodecylphenol alkoxylates of octylphenol, octylphenol alkoxylates of nonylphenol, nonylphenol alkoxylates of nonylphenol, dodecylphenol alkoxylates of nonylphenol, octylphenol alkoxylates of dodecylphenol, nonylphenol alkoxylates of dodecylphenol, dodecylphenol alkoxylates of dodecylphenol, octylphenol alkoxylates of alkoxyphenols, nonylphenol alkoxylates of alkoxyphenols, dodecylphenol alkoxylates of alkoxyphenols, phenol, naphthol, rosin alcohols, cholesterol, vitamin E, dimer diol, Guerbet alcohols, alcohols of the formula $CH_3(CH_2)_aOH$ wherein a is an integer of from about 25 to about 50, alcohols of the formula $C_bH_{2b}OH$ wherein b is an integer of from about 9 to about 24, N,N-dimethyl-N-ethanolamine, stearamide-monoethanolamine, tripropyleneglycol monomethylether, hydroxybutanone, menthol, isobomeol, terpineol, 12-hydroxy stearyl stearamide, ethylene glycol, diethylene glycol, triethylene glycol, dimethyloipropionic acid, sucrose, polytetramethylene glycol, polypropylene glycol, polyester polyols, polyethylene glycol, pentaerytbritol, triethanolamine, glycerin, 1,6-hexanediol, N-methyl-N,N-diethanol amine, trimethylol propane, N,N,N',N'-tetrakis(2-hydroxypropyl)ethylenediainine, or mixtures thereof.

14. An ink according to claim 1 wherein the compound is the reaction product of a mixture comprising (1) an isocyanate; and (2) a component comprising an amine having at least one vinyl ether group.

15. An ink according to claim 14 wherein the amine is of the formula $R_4$—$NHR_5$ wherein $R_4$ is (i) an alkyl group having at least one vinyl ether group therein, including linear and branched, cyclic and acyclic, and substituted and unsubstituted alkyl groups, (ii) an arylalkyl group having at least one vinyl ether group therein, including substituted and unsubstituted arylalkyl groups, wherein the alkyl portion of the arylalkyl group can be linear or branched, cyclic or acyclic, and substituted or unsubstituted, or (iii) an alkylaryl group having at least one vinyl ether group therein, including substituted and unsubstituted alkylaryl groups, wherein the alkyl portion of the alkylaryl group can be linear or branched, cyclic or acyclic, and substituted or unsubstituted, and wherein $R_5$ can be (i) a hydrogen atom, (ii) an alkyl group, including linear and branched, saturated and unsaturated, cyclic and acyclic, and substituted and unsubstituted alkyl groups, and wherein hetero atoms either may or may not be present in the alkyl group, (iii) an aryl group, including substituted and unsubstituted aryl groups, and wherein hetero atoms either may or may not be present in the aryl group, (iv) an arylalkyl group, including substituted and unsubstituted arylalkyl groups, wherein the alkyl portion of the arylalkyl group can be linear or branched, saturated or unsaturated, cyclic or acyclic, and substituted or unsubstituted, and wherein hetero atoms either may or may not be present in either the aryl or the alkyl portion of the arylalkyl group, or (v) an alkylaryl group, including substituted and unsubstituted alkylaryl groups, wherein the alkyl portion of the alkylaryl group can be linear or branched, saturated or unsaturated, cyclic or acyclic, and substituted or unsubstituted, and wherein hetero atoms either may or may not be present in either the aryl or the alkyl portion of the alkylaryl group.

16. An ink according to claim 14 wherein the amine is monoethanolamine vinyl ether.

17. An ink according to claim 16 further comprising 2(1-cyclohexenyl)ethylamine or N-ethyl-2-methylallylamine or a mixture thereof.

18. An ink according to claim 14 wherein the compound is ate; and (2) a component comprising a mixture of (a) an alcohol having at least one vinyl ether group and (b) an acid having at least one vinyl ether group.

22. An ink according to claim 1 wherein the phase change inducing component is of the formula $R_c$—OH wherein $R_c$ is (i) an alkyl group, including linear and branched, cyclic and acyclic, and substituted and unsubstituted alkyl groups, and wherein hetero atoms either may or may not be present in the alkyl group, (ii) an aryl group, including substituted and unsubstituted aryl groups, and wherein hetero atoms either may or may not be present in the aryl group, (iii) an arylalkyl group, including substituted and unsubstituted arylalkyl groups, wherein the alkyl portion of the arylalkyl group can be linear or branched, cyclic or acyclic, and substituted or unsubstituted, and wherein hetero atoms either may or may not be present in either the aryl or the alkyl portion of the arylalkyl group, or (iv) an alkylaryl group, including substituted and unsubstituted alkylaryl groups, wherein the alkyl

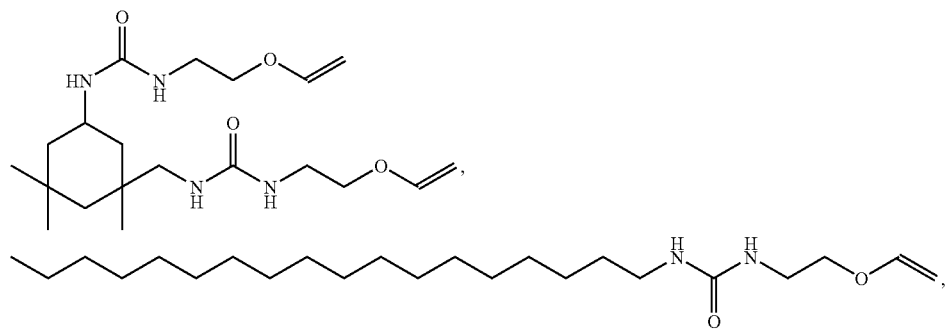

or mixtures thereof.

19. An ink according to claim 1 wherein the compound is the reaction product of a mixture comprising (1) an isocyanate; and (2) a component comprising a mixture of (a) an alcohol having at least one vinyl ether group and (b) an amine having at least one vinyl ether group.

20. An ink according to claim 19 wherein the compound is portion of the alkylaryl group can be linear or branched, cyclic or acyclic, and substituted or unsubstituted, and wherein hetero atoms either may or may not be present in either the aryl or the alkyl portion of the alkylaryl group.

23. An ink according to claim 1 wherein the phase change inducing component is 1,10-decanediol, 1,12-dodecanediol,

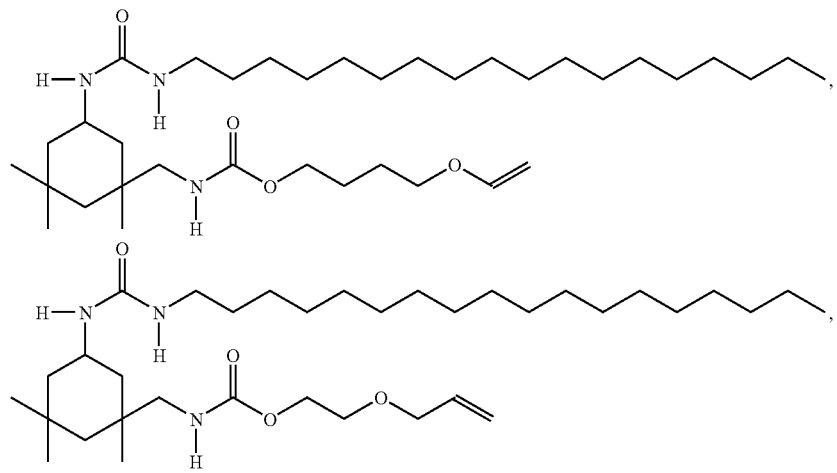

or mixtures thereof.

21. An ink according to claim 1 wherein the compound is the reaction product of a mixture comprising (1) an isocyan- 1,2-dodecanediol, a mixture of linear primary alcohols having a molecular weight of at least about 350, a polycaprolactone diol, heptadecanol, octadecanol, nonadecanol, eicosanol, heneicosanol, docosanol, dimer diols, Guerbet alcohols, or mixtures thereof.

24. An ink according to claim 1 wherein the phase change inducing component is hydrogenated castor oil.

25. An ink according to claim 1 wherein the phase change inducing component is present in the ink in an amount of at least about 5 percent by weight of the carrier.

26. An ink according to claim 1 wherein the phase change inducing component is present in the ink in an amount of at least about 10 percent by weight of the carrier.

27. An ink according to claim 1 wherein the phase change inducing component is present in the ink in an amount of no more than about 80 percent by weight of the carrier.

28. An ink according to claim 1 wherein the phase change inducing component is present in the ink in an amount of no more than about 30 percent by weight of the carrier.

29. A phase change ink comprising a colorant, an initiator, and a phase change ink carrier, the carrier comprising a compound selected from the group consisting of

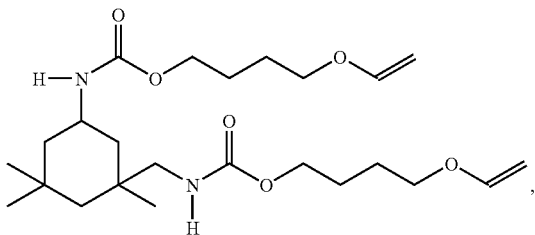

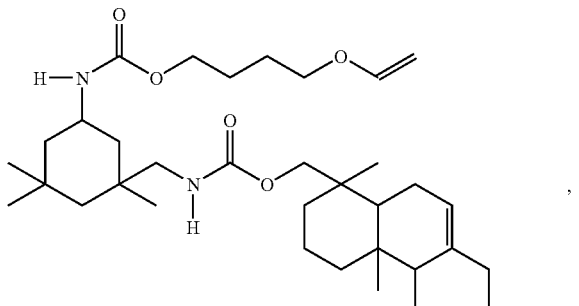

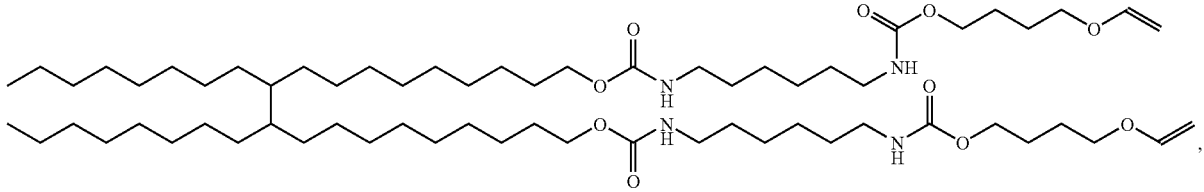

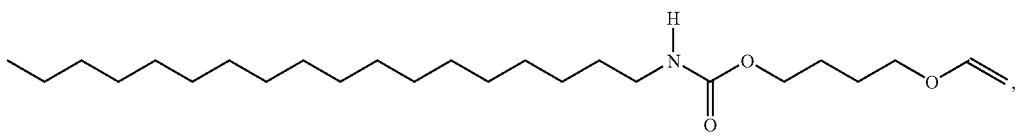

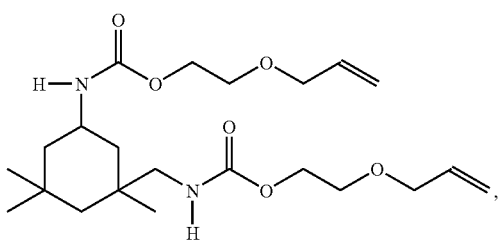

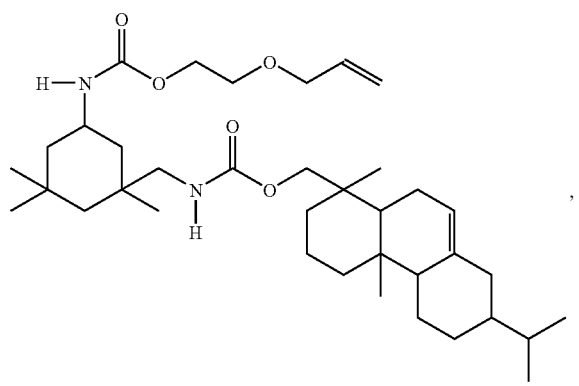

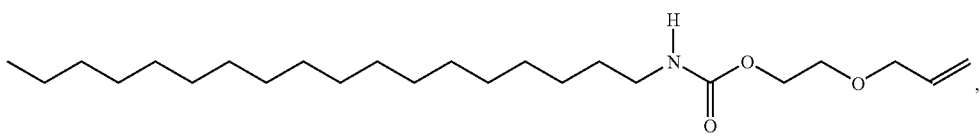

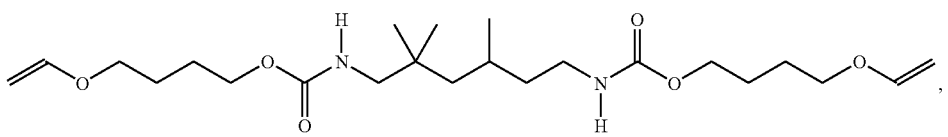

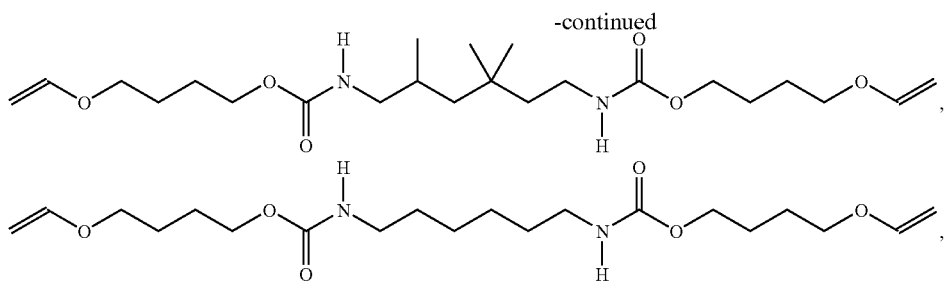
-continued and mixtures thereof, and (B) a phase change inducing component, the phase change inducing component containing at least one hydroxyl group, the phase change inducing component having a melting point of about 40° C. or higher, wherein the chase change ink has a viscosity of about 12 centipoise or lower at a temperature of between about 80° C. and about 120° C., and a viscosity of greater than about $10^5$ centipoise at a temperature of about 40° C. or lower.

30. A phase change ink comprising a colorant, an initiator, and a phase change ink carrier, said carrier comprising (A) a compound which is the reaction product of a mixture comprising (1) an isocyanate; and (2) a component comprising (a) an alcohol having at least one vinyl ether group; (b) an amine having at least one vinyl ether group; (c) an acid having at least one vinyl ether group; or (d) mixtures thereof, (B) a phase change inducing component, said phase change inducing component containing at least one hydroxyl group, said phase change inducing component having a melting point of about 40° C. or higher, and (C) a curable viscosity modifying ester of the formula

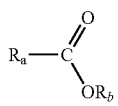

wherein $R_a$ is (i) an alkyl group, including linear and branched, cyclic and acyclic, and substituted and unsubstituted alkyl groups, and wherein hetero atoms either may or may not be present in the alkyl group, (ii) an arylalkyl group, including substituted and unsubstituted arylalkyl groups, wherein the alkyl portion of the arylalkyl group can be linear or branched, cyclic or acyclic, and substituted or unsubstituted, and wherein hetero atoms either may or may not be present in either the aryl or the alkyl portion of the arylalkyl group, or (iii) an alkylaryl group, including substituted and unsubstituted alkylaryl groups, wherein the alkyl portion of the alkylaryl group can be linear or branched, cyclic or acyclic, and substituted or unsubstituted, and wherein hetero atoms either may or may not be present in either the aryl or the alkyl portion of the alkylaryl group, and wherein $R_b$ is (i) an alkyl group having at least one vinyl ether group therein, including linear and branched, cyclic and acyclic, and substituted and unsubstituted alkyl groups, and wherein hetero atoms either may or may not be present in the alkyl group, (ii) an arylalkyl group having at least one vinyl ether group therein, including substituted and unsubstituted arylalkyl groups, wherein the alkyl portion of the arylalkyl group can be linear or branched, cyclic or acyclic, and substituted or unsubstituted, and wherein hetero atoms either may or may not be present in either the aryl or the alkyl portion of the arylalkyl group, or (iii) an alkylaryl group having at least one vinyl ether group therein, including substituted and unsubstituted alkylaryl groups, wherein the alkyl portion of the alkylaryl group can be linear or branched, cyclic or acyclic, and substituted or unsubstituted, and wherein hetero atoms either may or may not be present in either the aryl or the alkyl portion of the alkylaryl group, said ink being curable upon exposure to ultraviolet radiation, wherein the phase change ink has a viscosity of about 12 centipoise or lower at a temperature of between about 80° C. and about 120° C., and a viscosity of greater than about $10^5$ centipoise at a temperature of about 40° C. or lower.

31. An ink according to claim 30 wherein the curable viscosity modifying ester is bis[4-(vinyloxy)butyl] adipate, 4-[(vinyloxy)butyl] stearate, tris[4-(vinyloxy)butyl] trimellitate, bis[4-(vinyloxy)butyl] dodecanedioate, or mixtures thereof.

32. An ink according to claim 30 wherein the curable viscosity modifying ester is present in the phase change ink carrier in an amount of at least about 0.1 percent by weight of the carrier.

33. An ink according to claim 30 wherein the curable viscosity modifying ester is present in the phase change ink carrier in an amount of no more than about 30 percent by weight of the carrier.

* * * * *